United States Patent
Lu et al.

(10) Patent No.: US 11,812,503 B2
(45) Date of Patent: Nov. 7, 2023

(54) MOBILITY MANAGEMENT PROCESSING METHOD AND APPARATUS

(71) Applicant: Huawei Technologies Co., Ltd., Shenzhen (CN)

(72) Inventors: Wei Lu, Shenzhen (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 17/478,614

(22) Filed: Sep. 17, 2021

(65) Prior Publication Data
US 2022/0007168 A1  Jan. 6, 2022

Related U.S. Application Data

(63) Continuation of application No. 16/578,011, filed on Sep. 20, 2019, now Pat. No. 11,146,943, which is a
(Continued)

(51) Int. Cl.
*H04W 8/08* (2009.01)
*H04W 4/029* (2018.01)
(Continued)

(52) U.S. Cl.
CPC ............. *H04W 8/08* (2013.01); *H04W 4/029* (2018.02); *H04W 68/005* (2013.01); *H04W 76/11* (2018.02); *H04W 80/08* (2013.01)

(58) Field of Classification Search
CPC ..... H04W 8/08; H04W 4/029; H04W 68/005; H04W 76/11; H04W 80/08; H04W 68/08; H04W 68/04; H04W 76/12
(Continued)

(56) References Cited

U.S. PATENT DOCUMENTS 8,838,154 B1  9/2014 Singh et al.
2010/0265867 A1 * 10/2010 Becker .................. H04W 72/30
                                                          370/312
(Continued)

FOREIGN PATENT DOCUMENTS

CN   101803414 B    6/2013
EP     2908566 A1 *  8/2015 ........... H04L 45/745

OTHER PUBLICATIONS

U.S. Appl. No. 16/578,011, filed Sep. 20, 2019.
(Continued)

*Primary Examiner* — Inder P Mehra
(74) *Attorney, Agent, or Firm* — Leydig, Voit & Mayer, Ltd.

(57) ABSTRACT

A mobility management processing method includes: receiving, by an SMF network element, a data notification message that includes a PDU session identifier and that is sent by a UPF network element, and determining, based on the PDU session identifier, a session and SSC mode corresponding to the PDU session identifier and/or a service area of the UPF network element, where the UPF network element is a network element that establishes a PDU session corresponding to the PDU session identifier; determining a paging area based on the SSC mode and/or the service area of the UPF network element; and sending a first message including the paging area to an AMF network element, where the first message is used to trigger the AMF network element to page, in the paging area, a terminal that establishes the PDU session by using the UPF network element.

15 Claims, 14 Drawing Sheets

Related U.S. Application Data continuation of application No. PCT/CN2017/077597, filed on Mar. 21, 2017.

(51) Int. Cl.
  *H04W 68/00* (2009.01)
  *H04W 76/11* (2018.01)
  *H04W 80/08* (2009.01)
  *H04W 68/08* (2009.01)
  *H04W 68/04* (2009.01)
  *H04W 76/12* (2018.01)

(58) Field of Classification Search
  USPC .......................................................... 370/329
  See application file for complete search history.

(56) References Cited

U.S. PATENT DOCUMENTS

| | | | | |
|---|---|---|---|---|
| 2010/0273512 | A1* | 10/2010 | Wang | H04W 68/06 455/458 |
| 2018/0084524 | A1 | 3/2018 | Pradas et al. | |
| 2019/0037636 | A1 | 1/2019 | Kim et al. | |
| 2020/0092790 | A1* | 3/2020 | Salkintzis | H04W 40/00 |
| 2020/0187277 | A1* | 6/2020 | Lee | H04W 28/02 |

OTHER PUBLICATIONS

"Network triggered Service Request procedure," SA WG2 Meeting #118-BIS, Spokane, Washington, S2-170502, pp. 1-5, 3rd Generation Partnership Project, Valbonne, France (Jan. 16-20, 2017).

"3rd Generation Partnership Project; Technical Specification Group Services and System Aspects; Procedures for the 5G System; Stage 2; (Release 15)," 3GPP TS 23.502 V0.2.0, pp. 1-72, 3rd Generation Partnership Project, Valbonne, France (Feb. 2017).

"23.501-MM Implications of optimal UPF placement," SA WG2 Meeting #S2-119, S2-170756, Dubrovnik, Croatia, pp. 1-6, 3rd Generation Partnership Project, Valbonne, France (Feb. 13-17, 2017).

"3rd Generation Partnership Project; Technical Specification Group Services and System Aspects; System Architecture for the 5G System; Stage 2 (Release 15)," 3GPP TS 23.501 V0.3.1, pp. 1-98, 3rd Generation Partnership Project, Valbonne, France (Mar. 2017).

"3rd Generation Partnership Project; Technical Specification Group Services and System Aspects; Study on Architecture for Next Generation System (Release 14)," 3GPP TR 23.799 V14.0.0, total 522 pages, 3rd Generation Partnership Project, Valbonne, France (Dec. 2016).

LG Electronics, "SSC mode and UE mobility," SA WG2 Meeting #118-BIS, Spokane, WA, USA, S2-170238, total 3 pages, 3rd Generation Partnership Project, Valbonne, France (Jan. 16-20, 2017).

"3rd Generation Partnership Project; Technical Specification Group Services and System Aspects; Study on Architecture for Next Generation System (Release 14)," 3GPP TR 23.799 V1.2.0, total 526 pages, 3rd Generation Partnership Project, Valbonne, France (Nov. 2016).

"PDU session association in SSC mode 2 and SSC mode 3," SA WG2 Meeting #120, Busan, Korea, S2-171972, Total 3 pages, 3rd Generation Partnership Project, Valbonne, France (Mar. 27-31, 2017).

* cited by examiner

MOBILITY MANAGEMENT PROCESSING METHOD AND APPARATUS

CROSS-REFERENCE TO RELATED APPLICATIONS

This application a continuation of U.S. patent application Ser. No. 16/578,011, filed on Sep. 20, 2019, which is a continuation of International Application No. PCT/CN2017/077597, filed on Mar. 21, 2017. The disclosures of each of the aforementioned applications are hereby incorporated by reference in their entireties.

TECHNICAL FIELD

This application relates to the field of communications technologies, and in particular, to a mobility management processing method and apparatus.

BACKGROUND

In a next-generation wireless communications system, for example, in a new radio (NR) system, a terminal establishes a protocol data unit (PDU) session with a data network (DN) network element by using a user plane function (UPF) network element, and the PDU session provides a PDU connection service between the terminal and the DN network element.

The PDU session has three session and service continuity (SSC) modes: an SSC mode 1, an SSC mode 2, and an SSC mode 3.

SSC mode 1: In this mode, after the terminal establishes the PDU session, regardless of any area to which the terminal moves or any access technology, the UPF network element of the PDU session is used as an anchor to serve the terminal, that is, the PDU session is not interrupted due to movement of the terminal.

SSC mode 2: In this mode, after the terminal establishes the PDU session, if the terminal moves out of a service area of the UPF network element, a network may reselect a UPF network element for the PDU session of the terminal, to trigger the PDU session served by the original UPF network element and enable the terminal to establish a PDU session after the UPF network element is reselected. In this mode, it may be considered that the UPF network element has a specific service area. When the terminal moves within the service area, the UPF network element serves the terminal. However, if the terminal leaves the service area, a network side may determine that the UPF network element cannot serve the terminal, and the original PDU session established by using the UPF network element is interrupted.

SSC mode 3: In this mode, after the terminal establishes the PDU session, the UPF network element also has a specific service area. When the terminal leaves the service area of the UPF network element, a network selects a new UPF network element to serve the terminal, and the terminal establishes a PDU session with an original DN network element by using the new UPF network element. However, a difference from the SSC mode 2 lies in that, a connection for the PDU session established by the terminal by using the previous UPF network element may not be released until establishment of a new PDU session is completed.

After the terminal establishes the PDU session and is in an idle state, when the UPF network element receives a downlink data packet from the terminal or a core network device such as the UPF network element triggers a control signaling process, the network side first needs to page the terminal within a range of a tracking area list (TA List). Paging is performed on a per PDU session basis. To be specific, the terminal is paged based on a PDU session to which the downlink data packet or control signaling belongs, so that the terminal establishes a connection to the network side for the PDU session. However, in some modes, for example, in the SSC mode 2, the terminal may not be located in the service area of the UPF network element. If the terminal is not within the service area of the UPF network element, according to features of the SSC mode 2, a UPF network element of the PDU session may be reselected, causing the PDU session to be released. Therefore, in this case, the terminal cannot be precisely paged in the TA list range, and paging efficiency is reduced.

SUMMARY

This application provides a mobility management processing method and apparatus, to effectively perform mobility management on a terminal, so that the terminal can quickly access a network.

An embodiment of this application provides a mobility management processing method, where the method includes:

receiving, by a session management function (SMF) network element, a data notification message that includes a protocol data unit (PDU) session identifier and that is sent by a user plane function (UPF) network element, and determining, based on the PDU session identifier, a session and service continuity (SSC) mode corresponding to the PDU session identifier and/or a service area of the user plane function (UPF) network element, where the UPF network element is a network element that establishes a PDU session corresponding to the PDU session identifier;

determining, by the SMF network element, a paging area based on the SSC mode and/or the service area of the UPF network element; and sending, by the SMF network element, a first message including the paging area to an access and mobility management function (AMF) network element, where the first message is used to trigger the AMF network element to page, in the paging area, a terminal that establishes the PDU session by using the UPF network element.

According to the method provided in this embodiment of this application, after receiving the PDU session identifier sent by the UPF network element, the SMF network element may determine, based on the PDU session identifier, the SSC mode corresponding to the PDU session identifier and/or the service area of the UPF network element, so as to determine the paging area for paging the terminal and instruct the AMF network element to page the terminal based on the paging area. The determined paging area is smaller than or equal to an area indicated by a tracking area list of the terminal corresponding to the PDU session, so that whether the terminal can be successfully paged can be more quickly determined, thereby improving access efficiency of the terminal.

Optionally, the determining, by the SMF network element, a paging area based on the SSC mode and/or the service area of the UPF network element includes:

if it is determined that the SSC mode is an SSC mode 2, using, by the SMF network element, the service area as the paging area; or if it is determined that the SSC mode is an SSC mode 1 or an SSC mode 3, using, by the SMF network element as the paging area, an area indicated by a tracking area list; or determining, by the SMF network element, the paging area based on the tracking area list and the service area of the UPF network element.

Optionally, the determining, by the SMF network element, the paging area based on the tracking area list and the service area of the UPF network element includes:

determining, by the SMF network element as the paging area, an overlapping area of the service area and the area indicated by the tracking area list.

Optionally, the first message further includes a paging policy; and the paging policy includes one or more of the following:

a quantity of paging times, where the quantity of paging times indicates a quantity of times for which the AMF network element pages the terminal;

a paging cycle, where the paging cycle indicates a cycle in which the AMF network element pages the terminal; and paging indication information, where the paging indication information indicates a manner in which the AMF network element pages the terminal.

Optionally, the paging indication information indicates that if no paging response is received in the paging area, the AMF network element pages the terminal in the area indicated by the tracking area list.

Optionally, the method further includes:

starting, by the SMF network element, a first timer; and if it is determined after the first timer times out that the AMF network element receives no paging response, sending, by the SMF network element, packet discard indication information to the UPF network element, where the packet discard indication information is used to instruct the UPF network element to discard downlink data received from the terminal.

In the foregoing method, if it is determined after the first timer times out that the AMF network element receives no paging response from the terminal, the SMF network element instructs the UPF network element to discard downlink data packets received from the terminal. Especially for a PDU session in the SSC mode 2, if the terminal leaves the service area of the UPF network element, a UPF network element needs to be reselected for the PDU session, and an IP address of the terminal device may need to change. Consequently, the PDU session may be interrupted, and the data packets may no longer be sent to the terminal. Therefore, the data packets may be discarded, so that network resources of the UPF network element can be saved, and system operation efficiency can be improved.

An embodiment of this application provides a mobility management processing apparatus, where the apparatus may implement any one of the plurality of mobility management processing method embodiments provided in any one of the foregoing methods.

In a possible design, the apparatus includes a plurality of function modules, for example, including a processing unit and a transceiver unit, configured to implement the mobility management processing method provided above.

In a possible design, a structure of the apparatus includes a processor and a transceiver, where the processor is configured to support the apparatus in performing the corresponding functions in the mobility management processing method. The transceiver is configured to: support communication between the apparatus and another apparatus, and receive or send a message or an instruction in the mobility management processing method from or to another apparatus. The apparatus may further include a memory, where the memory is configured to be coupled to the processor, and the memory stores a program instruction and data for the apparatus.

An embodiment of this application provides a mobility management processing method, where the method includes:

receiving, by an access and mobility management function (AMF) network element, a first message that includes a paging area and that is sent by a session management function (SMF) network element, where the paging area is determined by the SMF network element based on a session and service continuity (SSC) mode and/or a service area of a user plane function (UPF) network element, the SSC mode and/or the service area of the UPF network element are/is determined by the SMF network element based on an obtained protocol data unit (PDU) session identifier, and the UPF network element is a network element that establishes a PDU session corresponding to the PDU session identifier; and paging, by the AMF network element in the paging area, a terminal that establishes, by using the UPF network element, the PDU session corresponding to the PDU session identifier.

According to the method provided in this embodiment of this application, after receiving the paging area sent by the SMF network element, the AMF network element may page the terminal based on the paging area. The paging area is determined by the SMF network element terminal based on the SSC mode corresponding to the PDU session identifier and/or the service area of the UPF network element, and is smaller than or equal to an area indicated by a tracking area list of the terminal corresponding to the PDU session, so that whether the terminal can be successfully paged can be more quickly determined, thereby improving access efficiency of the terminal.

Optionally, the paging, by the AMF network element in the paging area, a terminal that establishes, by using the UPF network element, the PDU session corresponding to the PDU session identifier includes:

sending, by the AMF network element, a second message to a radio access network (RAN) network element, where the second message includes a paging area, and the second message is used to trigger the radio access network network element to page the terminal based on the paging area.

Optionally, the paging area in the second message is used by the radio access network network element to determine the paging area in which the radio access network network element pages the terminal.

Optionally, the first message further includes a paging policy; and the paging policy includes one or more of the following:

a quantity of paging times, where the quantity of paging times is used to indicate a quantity of times of paging the terminal;

a paging cycle, where the paging cycle is used to indicate a cycle of paging the terminal; and paging indication information, where the paging indication information is used to indicate a manner of paging the terminal.

Optionally, the paging indication information indicates that if no paging response is received in the paging area, the AMF network element pages the terminal in the area indicated by the tracking area list.

An embodiment of this application provides a mobility management processing method, where the method includes:

receiving, by a session management function (SMF) network element, a data notification message that includes a protocol data unit (PDU) session identifier and that is sent by a user plane function (UPF) network element, and determining, based on the PDU session identifier, at least one of a session and service continuity (SSC) mode corresponding to the PDU session identifier and a service area of the UPF network element, where the UPF network element is a network element that establishes a PDU session corresponding to the PDU session identifier; and sending, by the SMF network element, a first message to an access and mobility management function (AMF) network element, where the first message includes at least one of the SSC mode and the service area, and the first message is used to trigger the AMF network element to page a terminal that establishes the PDU session by using the UPF network element.

Optionally, the method further includes:
starting, by the SMF network element, a first timer; and
if it is determined after the first timer times out that no paging response is received, discarding, by the SMF network element, a downlink data packet received from the terminal.

An embodiment of this application provides a mobility management processing apparatus, where the apparatus may implement any one of the plurality of mobility management processing method embodiments provided in any one of the foregoing methods.

In a possible design, the apparatus includes a plurality of function modules, for example, including a processing unit and a transceiver unit, configured to implement the mobility management processing method provided above.

In a possible design, a structure of the apparatus includes a processor and a transceiver, where the processor is configured to support the apparatus in performing the corresponding functions in the mobility management processing method. The transceiver is configured to: support communication between the apparatus and another apparatus, and receive or send a message or an instruction in the mobility management processing method from or to another apparatus. The apparatus may further include a memory, where the memory is configured to be coupled to the processor, and the memory stores a program instruction and data for the apparatus.

An embodiment of this application provides a mobility management processing method, where the method includes:

receiving, by an access and mobility management function (AMF) network element, a first message sent by a session management function (SMF) network element, where the first message includes at least one of a session and service continuity (SSC) mode and a service area of a user plane function (UPF) network element, the SSC mode and the service area are determined by the SMF network element based on an obtained protocol data unit (PDU) session identifier, and the service area is a service area of the UPF network element that establishes a PDU session corresponding to the PDU session identifier; and determining, by the AMF network element, a paging area based on at least one of the SSC mode and the service area, and paging, in the paging area, a terminal that establishes the PDU session by using the UPF network element.

Optionally, the determining, by the AMF network element, a paging area based on at least one of the SSC mode and the service area includes:

if it is determined that the SSC mode is an SSC mode 1, determining, by the AMF network element as the paging area, an area indicated by a tracking area list; or if it is determined that the SSC mode is an SSC mode 2 or an SSC mode 3, determining, by the AMF network element, the service area as the paging area, or determining an overlapping area of the service area and a tracking area list as the paging area.

Optionally, the paging, by the AMF network element in the paging area, a terminal that establishes the PDU session by using the UPF network element includes:

sending, by the AMF network element, a second message to a radio access network network element, where the second message includes a paging area, and the second message is used to trigger the radio access network network element to page the terminal based on the paging area.

Optionally, the second message further includes a paging policy; and the paging policy includes one or more of the following:
a quantity of paging times, where the quantity of paging times is used to indicate a quantity of times for which the radio access network network element pages the terminal;
a paging cycle, where the paging cycle is used to indicate a cycle in which the radio access network network element pages the terminal; and
paging indication information, where the paging indication information is used to indicate a manner in which the radio access network network element pages the terminal.

Optionally, the paging indication information indicates that if no paging response is received in the paging area, the radio access network network element pages the terminal in the area indicated by the tracking area list.

An embodiment of this application provides a mobility management processing apparatus, where the apparatus may implement any one of the plurality of mobility management processing method embodiments provided in any one of the foregoing methods.

In a possible design, the apparatus includes a plurality of function modules, for example, including a processing unit and a transceiver unit, configured to implement the mobility management processing method provided above.

In a possible design, a structure of the apparatus includes a processor and a transceiver, where the processor is configured to support the apparatus in performing the corresponding functions in the mobility management processing method. The transceiver is configured to: support communication between the apparatus and another apparatus, and receive or send a message or an instruction in the mobility management processing method from or to another apparatus. The apparatus may further include a memory, where the memory is configured to be coupled to the processor, and the memory stores a program instruction and data for the apparatus.

An embodiment of this application provides a mobility management processing method, where the method includes:

receiving, by a session management function (SMF) network element, a data notification message that includes a protocol data unit (PDU) session identifier and that is sent by a user plane function (UPF) network element, where the PDU session identifier is an identifier of a PDU session that corresponds to the PDU session identifier and that is established by a terminal by using the UPF network element;

determining, by the SMF network element, the service area of the UPF network element and a session and service continuity (SSC) mode of the PDU session based on the PDU session identifier; and determining, by the SMF network element based on the service area and the SSC mode of the PDU session, whether to trigger establishment of a user-plane transmission channel.

Optionally, the determining, by the SMF network element based on the service area and the SSC mode of the PDU session, whether to trigger establishment of a user-plane transmission channel includes:

if it is determined that the SSC mode of the PDU session is an SSC mode 2, and that the terminal is located in the service area, triggering, by the SMF network element, establishment of the user-plane transmission channel; or if it is determined that the SSC mode of the PDU session is an SSC mode 2, and that the terminal is not located in the service area, ignoring, by the SMF network element, the data notification message.

Optionally, after the ignoring, by the SMF network element, the data notification message, the method further includes:

sending, by the SMF, packet discard indication information to the UPF network element, where the packet discard indication information is used to instruct the UPF network element to discard downlink data received from the terminal.

An embodiment of this application provides a mobility management processing apparatus, where the apparatus may implement any one of the plurality of mobility management processing method embodiments provided in any one of the foregoing methods.

In a possible design, the apparatus includes a plurality of function modules, for example, including a processing unit and a transceiver unit, configured to implement the mobility management processing method provided above.

In a possible design, a structure of the apparatus includes a processor and a transceiver, where the processor is configured to support the apparatus in performing the corresponding functions in the mobility management processing method. The transceiver is configured to: support communication between the apparatus and another apparatus, and receive or send a message or an instruction in the mobility management processing method from or to another apparatus. The apparatus may further include a memory, where the memory is configured to be coupled to the processor, and the memory stores a program instruction and data for the apparatus.

An embodiment of this application provides a mobility management processing method, where the method includes:

receiving, by an access and mobility management function (AMF) network element, protocol data unit (PDU) session information sent by a session management function (SMF) network element, where the PDU session information includes at least one of an SSC mode of a first PDU session and a service area of a user plane function (UPF) network element that establishes the first PDU session; and determining, by the AMF network element based on the PDU session information, an area indicated by a tracking area list.

Optionally, after the determining, by the AMF network element based on the PDU session information, an area indicated by a tracking area list, the method further includes:

sending, by the AMF network element, the tracking area list to a terminal.

An embodiment of this application provides a mobility management processing apparatus, where the apparatus may implement any one of the plurality of mobility management processing method embodiments provided in any one of the foregoing methods.

In a possible design, the apparatus includes a plurality of function modules, for example, including a processing unit and a transceiver unit, configured to implement the mobility management processing method provided above.

In a possible design, a structure of the apparatus includes a processor and a transceiver, where the processor is configured to support the apparatus in performing the corresponding functions in the mobility management processing method. The transceiver is configured to: support communication between the apparatus and another apparatus, and receive or send a message or an instruction in the mobility management processing method from or to another apparatus. The apparatus may further include a memory, where the memory is configured to be coupled to the processor, and the memory stores a program instruction and data for the apparatus.

An embodiment of this application provides a mobility management processing method, where the method includes:

obtaining, by a session management function (SMF) network element, a protocol data unit (PDU) session identifier of a terminal and location information of the terminal; and if it is determined, based on the PDU session identifier and the location information of the terminal, to reselect a UPF network element of the first PDU session corresponding to the PDU session identifier, triggering, by the SMF network element by using an access and mobility management function (AMF) network element, the terminal to initiate a process of establishing a second PDU session.

Optionally, the triggering, by the SMF network element by using an access and mobility management function (AMF) network element, the terminal to establish a second PDU session includes:

determining, by the SMF network element, PDU session status information, and sending the PDU session status information to the terminal by using the AMF network element, where the PDU session status information instructs the terminal to initiate the process of establishing the second PDU session.

Optionally, the method further includes:

receiving, by the SMF network element, a data notification message that includes application information and that is sent by the UPF network element of the first PDU session, where the data notification message is sent after the UPF network element of the first PDU session receives a downlink data packet from the terminal.

Optionally, the method further includes:

sending, by the SMF network element, the application information to the AMF network element, where the application information is used to notify the terminal of application information used for triggering a paging process.

An embodiment of this application provides a mobility management processing apparatus, where the apparatus may implement any one of the plurality of mobility management processing method embodiments provided in any one of the foregoing methods.

In a possible design, the apparatus includes a plurality of function modules, for example, including a processing unit and a transceiver unit, configured to implement the mobility management processing method provided above.

In a possible design, a structure of the apparatus includes a processor and a transceiver, where the processor is configured to support the apparatus in performing the corresponding functions in the mobility management processing method. The transceiver is configured to: support communication between the apparatus and another apparatus, and receive or send a message or an instruction in the mobility management processing method from or to another apparatus. The apparatus may further include a memory, where the memory is configured to be coupled to the processor, and the memory stores a program instruction and data for the apparatus.

An embodiment of this application provides a mobility management processing method, where the method includes:

receiving, by a session management function (SMF) network element, service restriction area information sent by an access and mobility management function (AMF) network element; and selecting, by the SMF, a user plane function (UPF) network element for a terminal based on the service restriction area information, where the UPF network element is configured to establish a PDU session for the terminal.

An embodiment of this application further provides a mobility management processing apparatus. The apparatus includes a processor and a memory. The memory is configured to store a software program, and the processor is configured to: read the software program stored in the memory and implement the mobility management processing method provided in any one of the foregoing designs. The apparatus may be a mobile terminal, a computer, or the like.

An embodiment of this application further provides a computer storage medium, where the storage medium stores a software program. When being read and executed by one or more processors, the software program can implement the mobility management processing method provided in any one of the foregoing designs.

An embodiment of this application further provides a communications system, where the system includes the mobility management processing apparatus provided in any one of the foregoing designs. Optionally, the system may further include another device that interacts with the mobility management processing apparatus in the solution provided in this embodiment of this application.

An embodiment of this application further provides a computer program product including an instruction. When the computer program product runs on a computer, the computer performs the methods in the foregoing aspects.

DESCRIPTION OF EMBODIMENTS

The following further describes embodiments of this application in detail with reference to the accompanying drawings.

Embodiments of this application may be applied to various mobile communications systems, such as a global system for mobile communications (Global System of Mobile communication, GSM), a code division multiple access (CDMA) system, a wideband code division multiple access (WCDMA) system, a general packet radio service (GPRS) system, a long term evolution (LTE) system, a long term evolution advanced (Advanced long term evolution, LTE-A) system, a universal mobile telecommunications system (UMTS), an evolved long term evolution (eLTE) system, a 5G system (for example, an NR system), and other mobile communications systems.

Figure 1:
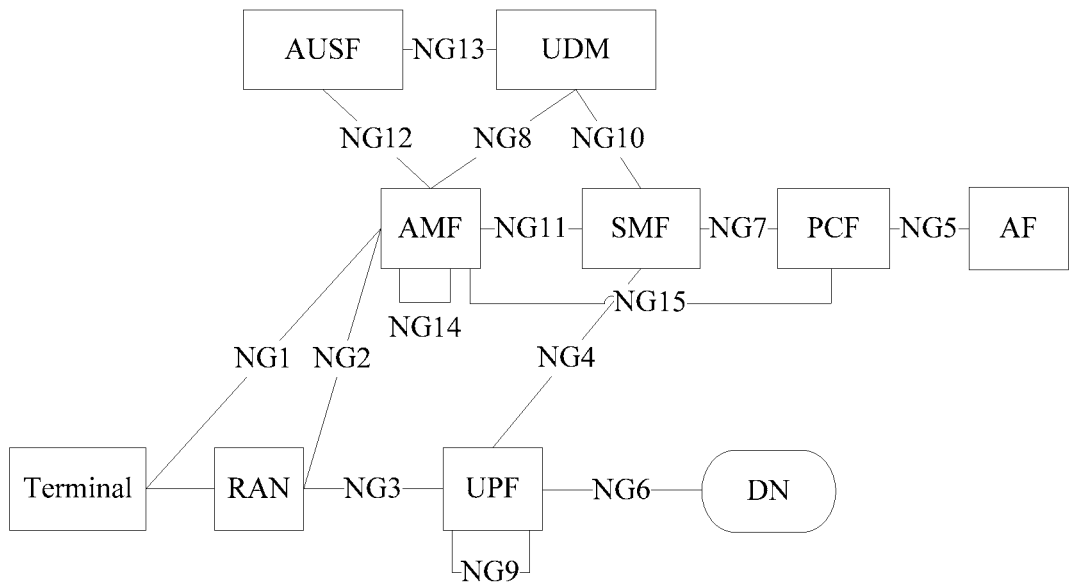
FIG. 1 is a schematic diagram of a first possible 5G network architecture.
Figure 2:
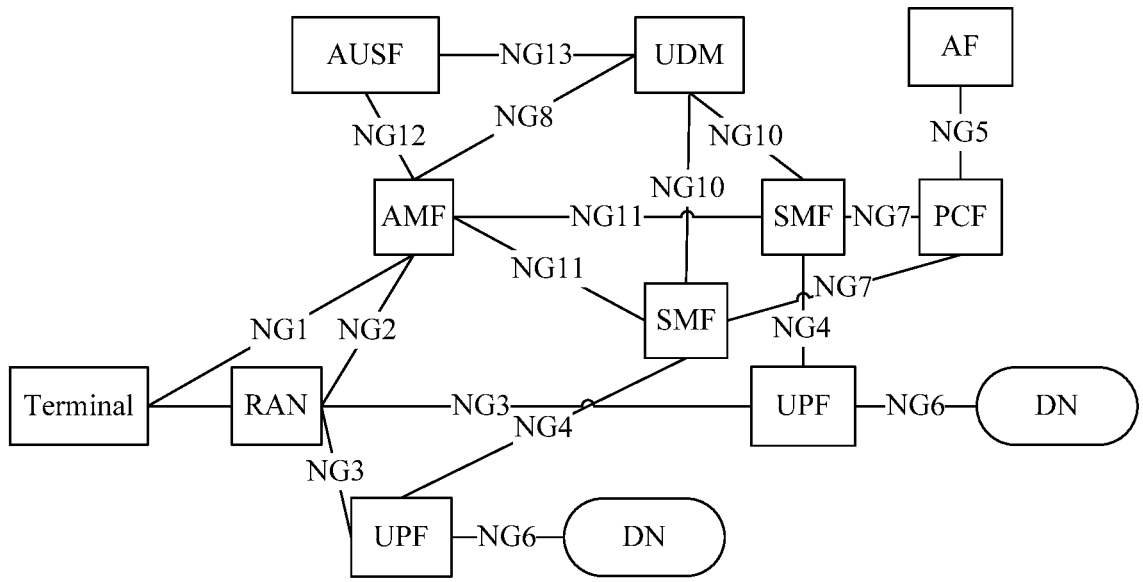
FIG. 2 is a schematic diagram of a second possible 5G network architecture.
Figure 3:
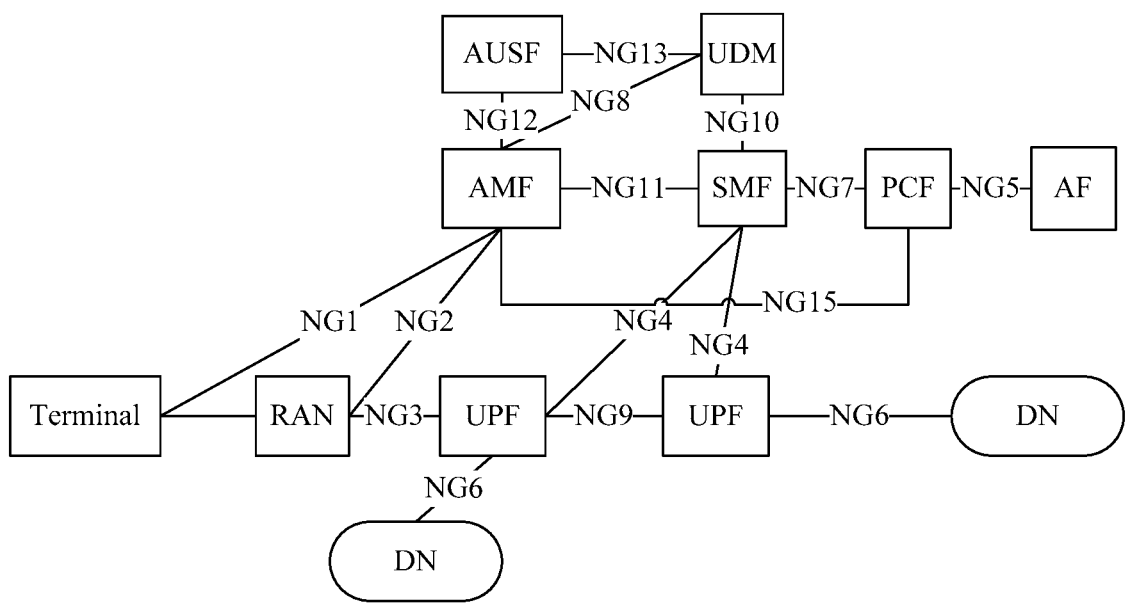
FIG. 3 is a schematic diagram of a third possible 5G network architecture.

There are a plurality of possible 5G network architectures that are being discussed. FIG. 1 to FIG. 3 are schematic diagrams of first to third possible 5G network architectures, respectively. In the network architecture shown in FIG. 1, there is one UPF network element between a RAN network element and a DN network element. In the network architecture shown in FIG. 2, there are two UPF network elements connected in parallel between a RAN network element and a DN network element. In the network architecture shown in FIG. 1, there are two UPF network elements connected in series between a RAN network element and a DN network element.

Systems shown in FIG. 1 to FIG. 3 include an authentication server function (AUSF) network element, a unified database management (Unified Data Management, UDM) function, an access and mobility management function (AMF) network element, a session management function (SMF) network element, a policy control function (PCF) network element, an application function (AF) network element, a radio access network (RAN) network element (which may also be referred to as an access network (AN) network element), a UPF network element, a DN network element, and the like. The SMF network element is responsible for session management, allocation and management of an internet protocol (IP) address of a terminal, allocation and selection of a UP anchor function, selection (or reselection) of the UPF and a user plane path, and the like. The AMF network element is responsible for access and mobility management, is a termination point of an NG2 interface (an interface between an AMF and a RAN device), terminates a non-access stratum (NAS) message, completes registration management, connection management and reachability management, TA list allocation, mobility management, and the like, and transparently routes a session management (SM) message to the SMF network element. The UPF network element is a user plane function device, and is responsible for functions such as routing and forwarding a data packet, lawful interception, caching a downlink data packet, and triggering a downlink data packet notification message.

In addition, it should be noted that in the embodiments of this application, a terminal, also referred to as user equipment (terminal), is a device that provides voice and/or data connectivity for a user, such as a handheld device or an in-vehicle device with a wireless connection function. Common terminals include, for example, a mobile phone, a tablet computer, a notebook computer, a palmtop computer, a mobile internet device (MID), and a wearable device, such as a smartwatch, a smart band, or a pedometer.

Figure 4:
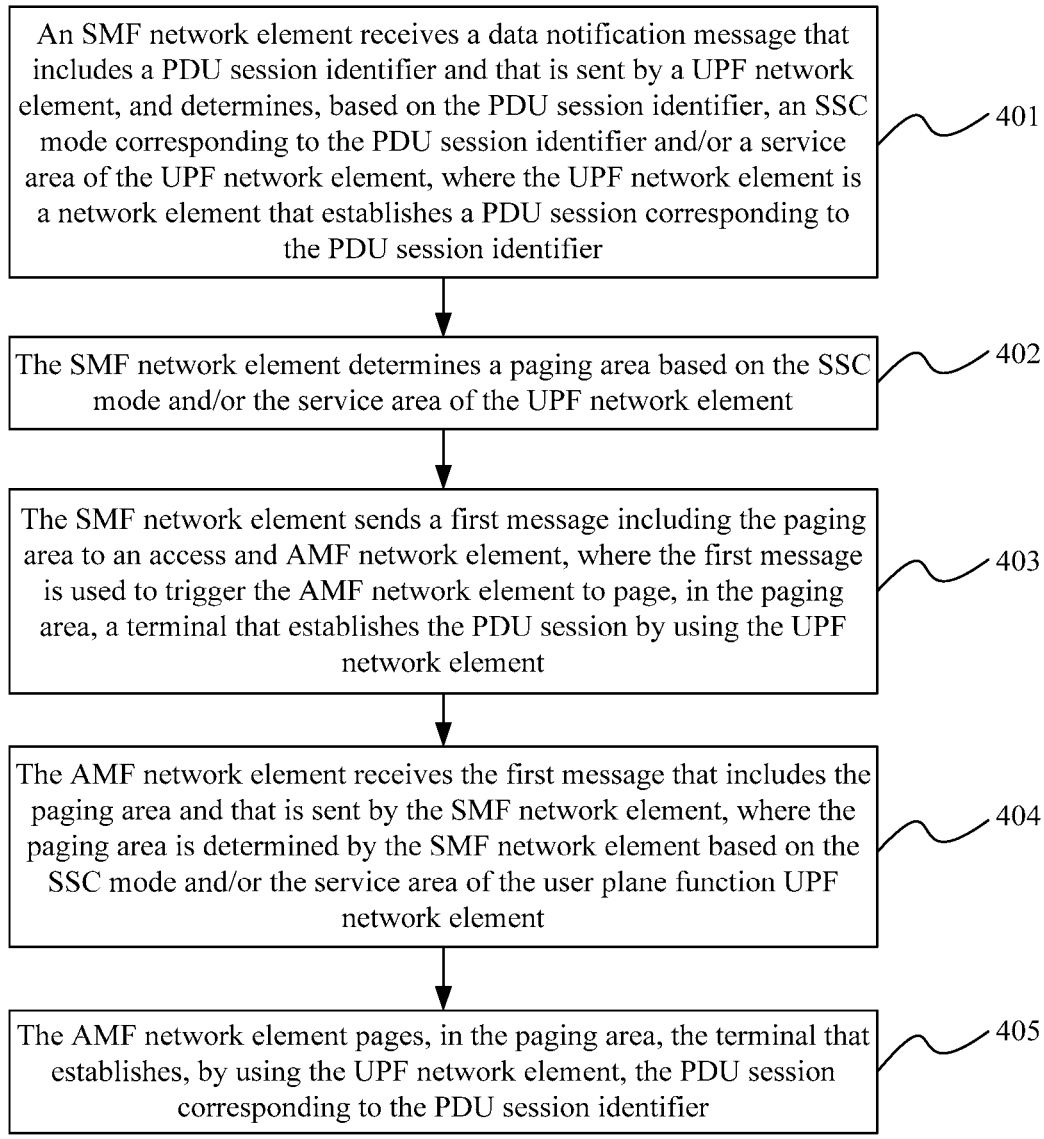
FIG. 4 is a schematic flowchart of a mobility management processing method according to an embodiment of this application.

Based on the foregoing description, FIG. 4 is a schematic flowchart of a mobility management processing method according to an embodiment of this application. The method includes the following steps.

Step 401: An SMF network element receives a data notification message that includes a PDU session identifier and that is sent by a UPF network element, and determines, based on the PDU session identifier, an SSC mode corresponding to the PDU session identifier and/or a service area of the UPF network element, where the UPF network element is a network element that establishes a PDU session corresponding to the PDU session identifier.

Step 402: The SMF network element determines a paging area based on the SSC mode and/or the service area of the UPF network element.

The paging area determined by the SMF network element is smaller than or equal to an area indicated by a tracking area list of a terminal corresponding to the PDU session.

Step 403: The SMF network element sends a first message including the paging area to an AMF network element, where the first message is used to trigger the AMF network element to page, in the paging area, the terminal that establishes the PDU session by using the UPF network element.

Step 404: The AMF network element receives the first message that includes the paging area and that is sent by the SMF network element, where the paging area is determined by the SMF network element based on the SSC mode and/or the service area of the user plane function (UPF) network element.

The SSC mode and/or the service area of the UPF network element are/is determined by the SMF network element based on the obtained PDU session identifier, and the UPF network element is a network element that establishes the PDU session corresponding to the PDU session identifier.

Step 405: The AMF network element pages, in the paging area, the terminal that establishes, by using the UPF network element, the PDU session corresponding to the PDU session identifier.

In step 401, after the terminal establishes the PDU session, when there is no non-access stratum (NAS) signaling connection or data transmission between the terminal and the AMF network element, the terminal is in an idle state, and neither an N2 interface (an interface between the AMF network element and a RAN network element) signaling connection nor an N3 interface (an interface between the RAN network element and the UPF network element) data (user plane) transmission channel connection exists. When the UPF network element receives a downlink data packet from the terminal, or a core network device such as the UPF network element triggers a control signaling process, the UPF network element may determine a PDU session identifier of a PDU session to which the downlink data packet or control signaling belongs.

After determining the PDU session identifier based on the downlink data packet received from the terminal, the UPF network element may send the data notification message including the PDU session identifier to the SMF network element, so as to instruct a network device (such as the SMF network element/the AMF network element) network element to page the terminal, to send the downlink data packet to the terminal.

The PDU session identifier can uniquely identify a PDU session, the PDU session is established by the terminal with a data network by using the UPF network element, and an SSC mode of each PDU session is determined upon establishment of the PDU session. Therefore, the SMF network element may determine, based on the PDU session identifier, at least one of the SSC mode corresponding to the PDU session identifier and the service area of the UPF network element that establishes the PDU session identifier.

In step 402, the SMF network element determines the paging area in a plurality of manners, and details are described below.

In a first possible paging area determining manner, if it is determined that the SSC mode of the PDU session corresponding to the PDU session identifier is an SSC mode 2, the SMF network element may use, as the paging area, the service area of the UPF network element that establishes the PDU session.

It should be noted that the paging area may be the same as or different from the service area of the UPF network element. For example, the SMF network element may determine, based on a historical location of the terminal, a historical area on which the terminal camps in the service area as the paging area. In this case, the paging area is smaller than the service area of the UPF network element.

In a second possible paging area determining manner, if it is determined that the SSC mode of the PDU session is an SSC mode 1 or an SSC mode 3, the SMF network element uses, as the paging area, the area indicated by the tracking area list.

In a third possible paging area determining manner, the SMF network element determines the paging area based on the tracking area list and the service area of the UPF network element. Specifically, the SMF network element may determine, as the paging area, an overlapping area of the service area and the area indicated by the tracking area list.

It should be noted that the tracking area list is allocated by a mobility management network element (for example, the AMF network element), and indicates a location area. When moving within the area indicated by the tracking area list, the terminal does not initiate a tracking area update procedure. When leaving the area indicated by the tracking area list, the terminal initiates a tracking area update procedure. To initiate a tracking area update procedure is to enable a mobile network to learn a location area of the terminal, so that a mobility management process can be more effectively performed. In 5G technical research, the tracking area update procedure may also be referred to as a mobility registration update procedure. The terminal device registers a current location of the terminal device with a network side again through this procedure.

Figure 5:
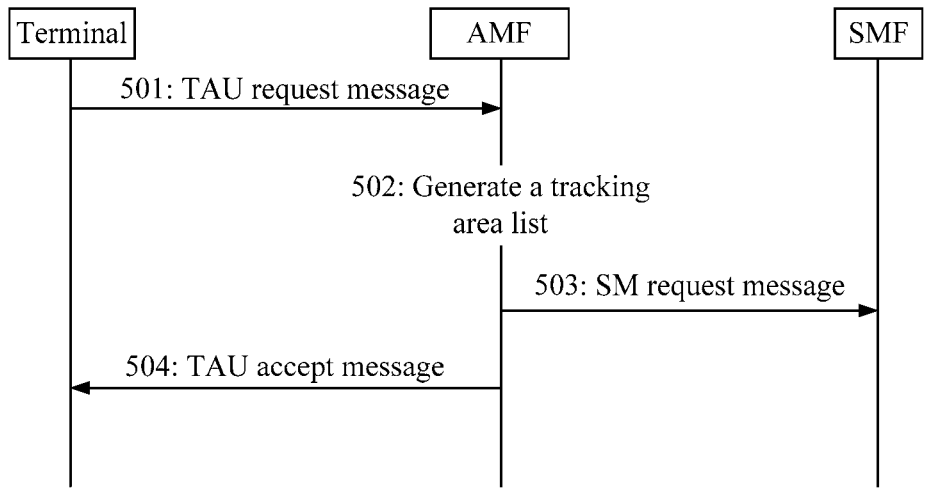
FIG. 5 is a schematic diagram of a tracking area update procedure according to an embodiment of this application.

In this embodiment of this application, the AMF network element may send the tracking area list to the SMF network element after generating the tracking area list. A manner in which the AMF network element sends the tracking area list to the SMF network element is not limited in this embodiment of this application. For example, the AMF network element may send the tracking area list in a process in which the terminal registers with a mobile communications network, or may send the tracking area list to the SMF network element in the tracking area update procedure of the terminal. Specifically, FIG. 5 is a schematic diagram of a tracking area update procedure according to an embodiment of this application. In FIG. 5, the tracking area update procedure includes the following steps.

Step 501: The terminal sends a tracking area update (TAU) or mobility registration update (MRU) request message to the AMF network element, to trigger the tracking area update procedure of the terminal.

Step 502: The AMF network element generates a tracking area list after receiving the TAU or MRU request message.

A specific manner in which the AMF network element generates the tracking area list is not limited in this embodiment of this application.

Step 503: The AMF network element sends an SM request message including the tracking area list to the SMF network element. This step is intended to notify the SMF network element of the tracking area list.

It should be noted that, in addition to the message, a process in which the AMF network element sends the tracking area list to the SMF network element may be performed in another message.

Step 504: The AMF network element sends a TAU accept message including the tracking area list to the terminal.

It should be noted that an order of performing step 503 and step 504 is not limited.

Optionally, the SMF network element may further start a first timer, wherein a timing duration of the first timer is a preset duration, and the preset duration may be determined depending on a specific case. This is not limited in this embodiment of this application. If it is determined after the first timer times out that the AMF network element receives no paging response, the SMF network element sends packet discard indication information to the UPF network element, where if no service request process triggered in a paging process is received within a specific time, it may be considered that no paging response is received, and the packet discard indication information is used to instruct the UPF network element to discard a downlink data packet received from the terminal.

Optionally, the UPF network element may also start a second timer, for example, start the second timer after receiving the downlink data packet from the terminal or sending the data notification message to the SMF network element. If it is determined after the second timer times out that the AMF network element receives no paging response, the UPF network element discards the downlink data packet received from the terminal. A timing duration of the second timer may be determined depending on a specific case. This is not limited in this embodiment of this application.

According to the foregoing method, if it is determined within a specific time that the AMF network element receives no paging response from the terminal, the SMF network element instructs the UPF network element to discard downlink data packets received from the terminal. Especially for the PDU session in the SSC mode 2, if the terminal leaves the service area of the UPF network element, a UPF network element needs to be reselected for the PDU session, and an IP address of the terminal device may need to change. Consequently, the PDU session may be interrupted, and the data packets may no longer be sent to the terminal. Therefore, the data packets may be discarded, so that network resources of the UPF network element can be saved, and system operation efficiency can be improved.

It should be noted that, in this embodiment of this application, the SMF network element may start the first timer after receiving the data notification message, or may start the first timer when sending the first message to the AMF network element. Details may be determined depending on an actual case. This is not limited in this embodiment of this application.

In step 403, the SMF network element may further send a paging policy to the AMF network element by using the first message.

In this embodiment of this application, the paging policy may include one or more of the following:

a quantity of paging times, where the quantity of paging times indicates a quantity of times for which the AMF network element pages the terminal;

a paging cycle, where the paging cycle indicates a cycle in which the AMF network element pages the terminal; and paging indication information, where the paging indication information indicates a manner in which the AMF network element pages the terminal; for example, the paging indication information may indicate that if no paging response is received in the paging area, the AMF network element pages the terminal in the area indicated by the tracking area list.

Certainly, alternatively, the SMF network element may not send the paging indication information, but implicitly instruct the AMF network element to page the terminal separately in the paging area and in the area indicated by the tracking area list. For example, the SMF network element sends the first message including the paging area and the tracking area list to the AMF network element, so as to instruct the AMF network element to page, if no paging response is received in the paging area, the terminal in the area indicated by the tracking area list.

It should be noted that the first message may further include information such as the PDU session identifier.

After receiving the first message in step 404, the AMF network element may send a second message to a radio access network network element in step 405. The second message includes a paging area, and the second message is used to trigger the radio access network network element to page the terminal based on the paging area. The radio access network network element determines, based on some information about an access network, a paging area for paging the terminal, and the paging area sent by the AMF network element by using the second message may be only one factor based on which the radio access network network element determines the paging area for paging the terminal. Therefore, the paging area in the second message may be different from the paging area in which the radio access network network element pages the terminal. Therefore, the paging area in the second message may be used by the radio access network network element to determine the paging area in which the radio access network network element pages the terminal.

Optionally, the AMF network element may further send information such as the paging policy to the radio access network network element by using the second message, and finally the radio access network network element may page the terminal based on the paging area and the paging policy.

For a specific process in which the radio access network network element pages the terminal, refer to description in the prior art.

In this embodiment of this application, after sending the second message to the radio access network network element, if the AMF determines that the radio access network network element receives no paging response from the terminal in the paging area, the AMF may further instruct the radio access network network element to page the terminal in the area indicated by the tracking area list.

The foregoing process is described below by using a specific embodiment.

Figure 6:
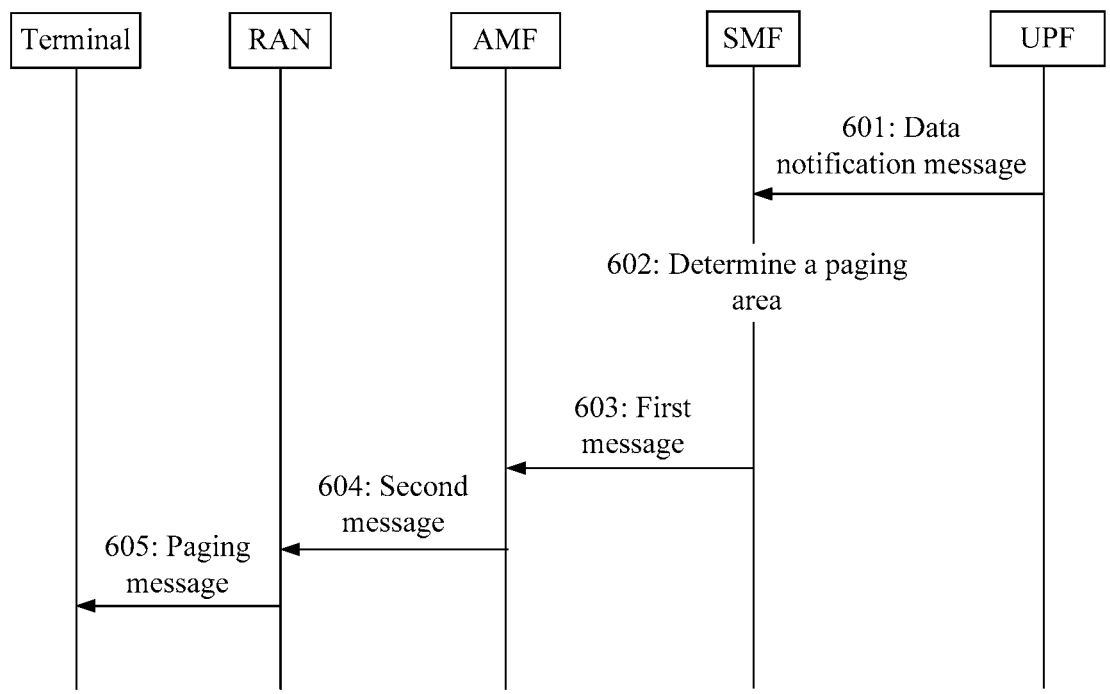
FIG. 6 is a schematic diagram of a mobility management processing process according to an embodiment of this application.

FIG. 6 is a schematic diagram of a mobility management processing process according to an embodiment of this application. Before a paging process shown in FIG. 6, a terminal establishes a PDU session with a DN network element by using a UPF network element, and then the terminal enters an idle state.

Step 601: After receiving a downlink data packet of the PDU session, the UPF network element sends a data notification message to an SMF network element, where the data notification message includes information such as a PDU session identifier of the PDU session.

Step 602: The SMF network element determines, based on the PDU session identifier, the UPF network element that establishes a connection for the PDU session corresponding to the PDU session identifier, and determines a paging area based on a service area of the UPF network element and an SSC mode of the PDU session.

For a specific method for determining the paging area, refer to the foregoing description. Details are not described herein again.

Optionally, the SMF network element may start a first timer; and if no paging response is received after the first timer times out, the SMF network element sends packet discard indication information to the UPF network element.

Step 603: The SMF network element sends a first message to an AMF network element, where the first message may include the PDU session identifier, the paging area, a paging policy, and the like.

The first message may be referred to as an N11 message. The N11 message is provisionally defined in an existing protocol, and may be changed in the future.

Step 604: The AMF network element sends a second message to a radio access network network element, where the second message may include the paging area, a tracking area list, a paging policy, and the like.

Step 605: The RAN network element sends a paging message to the terminal based on information such as the paging area and/or the paging policy, so as to page the terminal.

According to the foregoing method, after receiving the data notification message including the PDU identifier, the SMF network element determines, based on the PDU identifier, the service area of the UPF network element corresponding to the PDU identifier and the SSC mode, so as to determine the paging area based on the service area of the UPF network element and the SSC mode, and instruct the AMF to page the terminal based on the paging area. The determined paging area is smaller than or equal to the area indicated by the tracking area list of the terminal corresponding to the PDU session, so that whether the terminal can be successfully paged can be more quickly determined, thereby improving access efficiency of the terminal.

Figure 7:
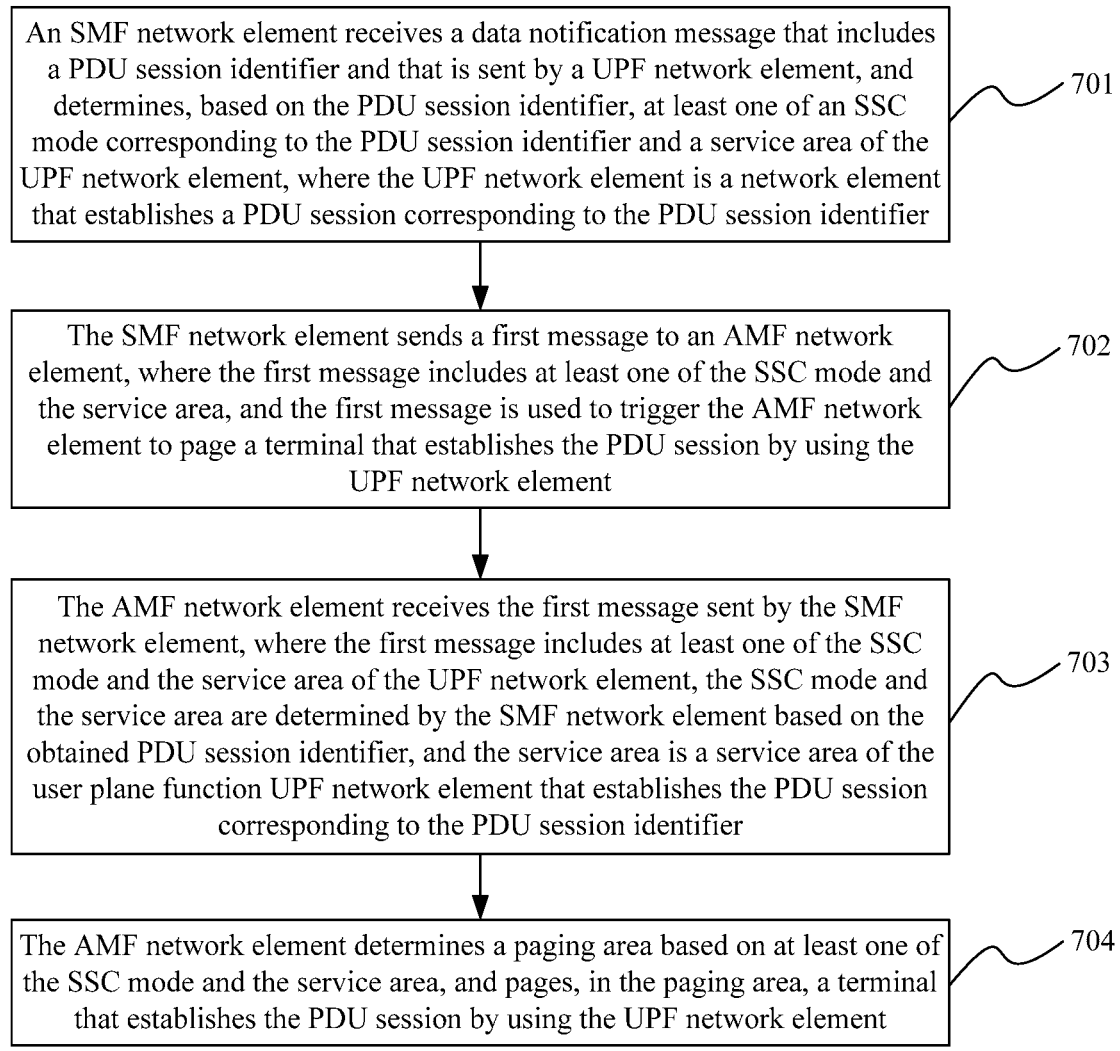
FIG. 7 is a schematic flowchart of a mobility management processing method according to an embodiment of this application.

In this embodiment of this application, alternatively, the AMF network element may determine the paging area. Specifically, FIG. 7 is a schematic flowchart of a mobility management processing method according to an embodiment of this application. The method includes the following steps:

Step 701: An SMF network element receives a data notification message that includes a PDU session identifier and that is sent by a UPF network element, and determines, based on the PDU session identifier, at least one of an SSC mode corresponding to the PDU session identifier and a service area of the UPF network element, where the UPF network element is a network element that establishes a PDU session corresponding to the PDU session identifier.

Step 702: The SMF network element sends a first message to the AMF network element, where the first message includes at least one of the SSC mode and the service area, and the first message is used to trigger the AMF network element to page a terminal that establishes the PDU session by using the UPF network element.

Step 703: The AMF network element receives the first message sent by the SMF network element, where the first message includes at least one of the SSC mode and the service area of the UPF network element, the SSC mode and the service area are determined by the SMF network element based on the obtained PDU session identifier, and the service area is a service area of the user plane function UPF network element that establishes the PDU session corresponding to the PDU session identifier.

Step 704: The AMF network element determines a paging area based on at least one of the SSC mode and the service area, and pages, in the paging area, the terminal that establishes the PDU session by using the UPF network element.

Optionally, the paging area is smaller than or equal to an area indicated by a tracking area list of the terminal corresponding to the PDU session.

In step 701, after the terminal establishes the PDU session, when there is no NAS signaling connection between the terminal and the AMF network element, the terminal is in an idle state. When the UPF network element receives a downlink data packet from the terminal, or a core network device such as the UPF network element triggers a control signaling process, the UPF network element may determine a PDU session identifier of a PDU session to which the downlink data packet or control signaling belongs.

After determining the PDU session identifier, the UPF network element may send the data notification message including the PDU session identifier to the SMF network element, so as to notify the SMF network element that the terminal needs to be paged, to send the downlink data packet to the terminal.

After receiving the data notification message including the PDU session identifier, the SMF network element may determine, based on the PDU session identifier, at least one of the SSC mode corresponding to the PDU session identifier and the service area of the UPF network element that establishes the PDU session identifier.

Optionally, the SMF network element may further start a first timer, wherein a timing duration of the first timer is a preset duration, and the preset duration may be determined depending on a specific case. This is not limited in this embodiment of this application. If it is determined after the first timer times out that no paging response is received, the SMF network element sends packet discard indication information to the UPF network element, where the packet discard indication information is used to instruct the UPF network element to discard the downlink data packet received from the terminal.

Optionally, the UPF network element may also start a second timer, for example, start the second timer after receiving the downlink data packet from the terminal or sending the data notification message to the SMF network element. If it is determined after the second timer times out that no paging response is received, the UPF network element discards the downlink data packet received from the terminal. A timing duration of the second timer may be determined depending on a specific case. This is not limited in this embodiment of this application.

According to the foregoing method, if it is determined within a specific time that the AMF network element receives no paging response from the terminal, the SMF network element instructs the UPF network element to discard the downlink data packet received from the terminal, so that network resources of the UPF network element can be saved, and system operation efficiency can be improved.

In step 702, the first message sent by the SMF network element to the AMF network element may further include information such as the PDU session identifier.

In step 703, the AMF network element determines the paging area in a plurality of manners, and details are described below.

In a first possible paging area determining manner, if it is determined that the SSC mode is an SSC mode 1, the AMF network element determines, as the paging area, the area indicated by the tracking area list.

In a second possible paging area determining manner, if it is determined that the SSC mode is an SSC mode 2 or an SSC mode 3, the AMF network element determines the service area as the paging area.

It should be noted that the paging area may be the same as or different from the service area of the UPF network element. For example, the SMF network element may determine, based on a historical location of the terminal, a historical area on which the terminal camps in the service area as the paging area. In this case, the paging area is smaller than the service area of the UPF network element.

In a third possible paging area determining manner, if it is determined that the SSC mode is an SSC mode 2 or an SSC mode 3, the AMF network element determines an overlapping area of the service area and the tracking area list as the paging area.

Optionally, the AMF may further determine a paging policy, and the paging policy may include one or more of the following:

a quantity of paging times, where the quantity of paging times is used to indicate a quantity of times for which a radio access network network element pages the terminal;

a paging cycle, where the paging cycle is used to indicate a cycle in which the radio access network network element pages the terminal; and paging indication information, where the paging indication information is used to indicate a manner in which the radio access network network element pages the terminal; for example, the paging indication information indicates that if no paging response is received in the paging area, the radio access network network element pages the terminal in the area indicated by the tracking area list. Certainly, alternatively, the AMF network element may not send the paging indication information, but implicitly instruct the radio access network network element to page the terminal separately in the paging area and in the area indicated by the tracking area list. For example, the AMF network element sends a second message including the paging area and the tracking area list to the radio access network network element, so as to instruct the radio access network network element to page, if no paging response is received in the paging area, the terminal in the area indicated by the tracking area list.

In step 704, the AMF network element may send the second message to the radio access network network element, where the second message includes a paging area, and the second message is used to trigger the radio access network network element to page the terminal based on the paging area.

Optionally, the second message may further include information such as the PDU session identifier and the paging policy.

Finally, the radio access network network element performs paging based on the paging area. For a specific paging process, refer to the prior art.

The foregoing process is described below by using a specific embodiment.

Figure 8:
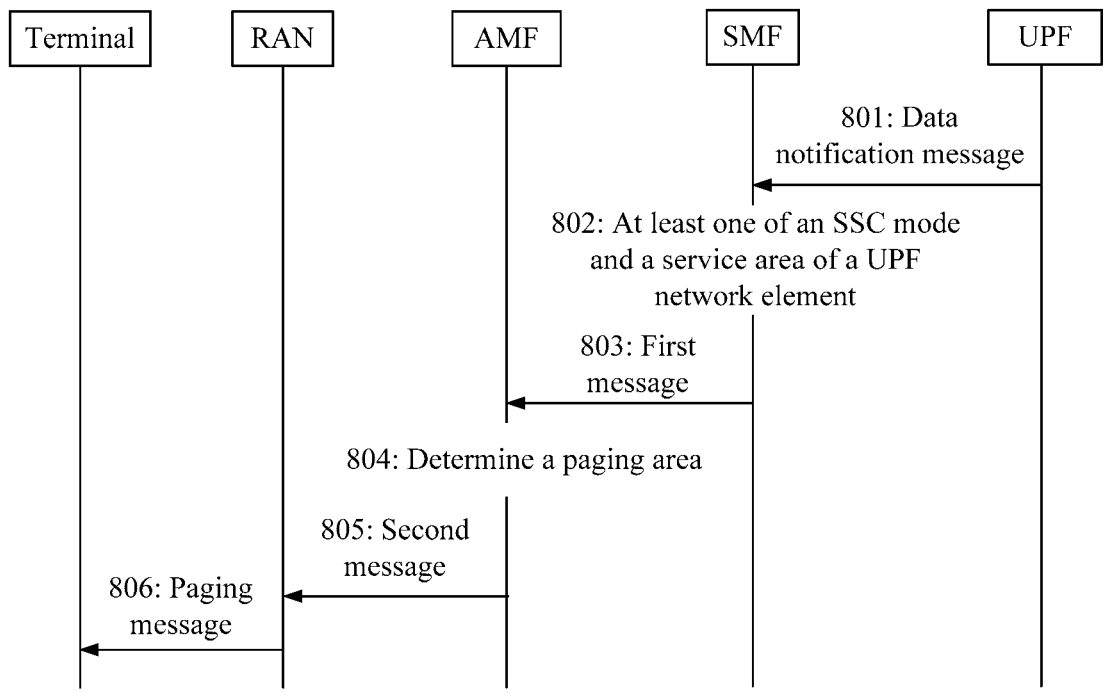
FIG. 8 is a schematic diagram of a mobility management processing process according to an embodiment of this application.

FIG. 8 is a schematic diagram of a mobility management processing process according to an embodiment of this application. Before a paging process shown in FIG. 8, a terminal establishes a PDU session with a DN network element by using a UPF network element, and then the terminal enters an idle state.

Step 801: After receiving a downlink data packet of the PDU session, the UPF network element sends a data notification message to an SMF network element, where the data notification message includes information such as a PDU session identifier of the PDU session.

Step 802: The SMF network element determines, based on the PDU session identifier, the UPF network element that establishes a connection for the PDU session corresponding to the PDU session identifier and an SSC mode corresponding to the PDU session identifier.

Optionally, the SMF network element may start a first timer; and if it is determined after the first timer times out that an AMF network element receives no paging response, the SMF network element sends packet discard indication information to the UPF network element.

Step 803: The SMF network element sends a first message to the AMF network element, where the first message may include at least one of the SSC mode and a service area of the UPF network element.

The first message may further include the PDU session identifier. The first message may also be referred to as an N11 message.

Step 804: The AMF network element determines a paging area based on at least one of the SSC mode and the service area of the UPF network element.

For a specific process in which the AMF network element determines the paging area, refer to the foregoing description. Details are not described herein again.

Optionally, the AMF network element may further determine a paging policy.

Step 805: The AMF network element sends a second message to a radio access network network element, where the second message may include the paging area and a tracking area list.

Optionally, the second message may further include the paging policy.

Step 806: The RAN network element sends a paging message to the terminal based on information such as the paging area and/or the paging policy, so as to page the terminal.

According to the foregoing method, after receiving the first message including at least one of the SSC mode and the service area of the UPF network element, the AMF network element determines the paging area based on at least one of the SSC mode and the service area of the UPF network element, and instructs the radio access network network element to page the terminal based on the paging area. The determined paging area is smaller than or equal to an area indicated by the tracking area list of the terminal corresponding to the PDU session, so that whether the terminal can be successfully paged can be more quickly determined, thereby improving access efficiency of the terminal.

In this embodiment of this application, after the terminal switches to a connected state, the SMF network element may further determine whether to trigger establishment of a user-plane transmission channel. The terminal switches to a connected state in a plurality of cases, including but not limited to: a paging and service request process triggered when a downlink data packet for one PDU session of the terminal is received, or a signaling process triggered by a network-side device such as a PCF network element or the UPF network element.

Figure 9:
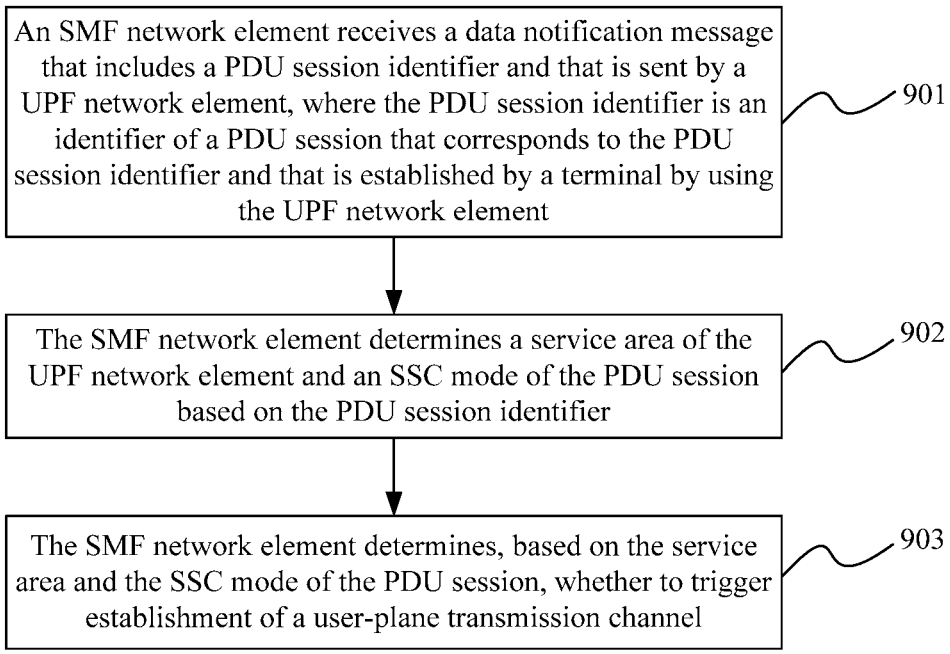
FIG. 9 is a schematic flowchart of a mobility management processing method according to an embodiment of this application.

Specifically, FIG. 9 is a schematic flowchart of a mobility management processing method according to an embodiment of this application. The method includes the following steps:

Step 901: An SMF network element receives a data notification message that includes a PDU session identifier and that is sent by a UPF network element, where the PDU session identifier is an identifier of a PDU session that corresponds to the PDU session identifier and that is established by a terminal by using the UPF network element.

Step 902: The SMF network element determines a service area of the UPF network element and an SSC mode of the PDU session based on the PDU session identifier.

Step 903: The SMF network element determines, based on the service area and the SSC mode of the PDU session, whether to trigger establishment of a user-plane transmission channel.

For specific content of step 901 and step 902, refer to the descriptions in step 401 and step 402. Details are not described herein again.

In step 903, in a first possible implementation, if it is determined that the SSC mode of the PDU session is an SSC mode 2, and that the terminal is located in the service area, the SMF network element triggers establishment of the user-plane transmission channel.

In a second possible implementation, if it is determined that the SSC mode of the PDU session is an SSC mode 2, and that the terminal is not located in the service area, the SMF network element ignores the data notification message.

In a third possible implementation, if it is determined that the terminal is located in the service area, the SMF network element triggers establishment of the user-plane transmission channel.

In a fourth possible implementation, if it is determined that the SSC mode of the PDU session is an SSC mode 1 or an SSC mode 3, and that the terminal is not located in the service area, the SMF network element triggers establishment of the user-plane transmission channel.

Optionally, after ignoring the data notification message, the SMF network element may further send packet discard indication information to the UPF network element, where the packet discard indication information is used to instruct the UPF network element to discard downlink data received from the terminal.

The foregoing process is described below by using a specific embodiment.

Figure 10:
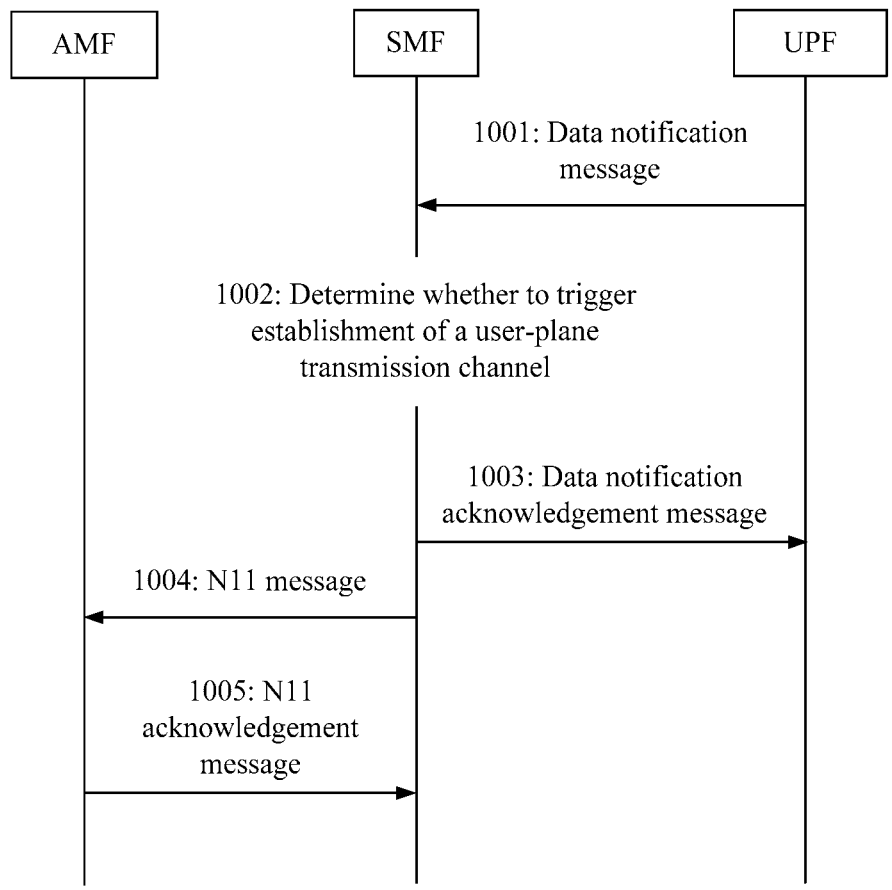
FIG. 10 is a schematic diagram of a mobility management processing method according to an embodiment of this application.

FIG. 10 is a schematic flowchart of a mobility management processing method according to an embodiment of this application. Before a procedure shown in FIG. 10, the terminal has switched to a connected state.

Step 1001: After receiving a downlink data packet from a terminal, a UPF network element sends a data notification message to an SMF network element, where the data notification message includes information such as a PDU session identifier of a PDU session to which the downlink data packet belongs.

Step 1002: The SMF network element determines, based on the PDU session identifier, the UPF network element that establishes a connection for the PDU session corresponding to the PDU session identifier and an SSC mode corresponding to the PDU session identifier, and determines, based on a service area of the UPF network element and the SSC mode of the PDU session, whether to trigger establishment of a user-plane transmission channel.

Specifically, if it is determined that the SSC mode of the PDU session is an SSC mode 2, and that the terminal is located in the service area, the SMF network element triggers establishment of the user-plane transmission channel, and performs step 1003 and steps following step 1003.

In a second possible implementation, if it is determined that the SSC mode of the PDU session is an SSC mode 2, and that the terminal is not located in the service area, the SMF network element ignores the data notification message, skips step 1003, and performs step 1004 and a step following step 1004. Optionally, the SMF network element may instruct the UPF network element to discard the downlink data packet received from the terminal, and the subsequent steps are not to be performed.

In a third possible implementation, if it is determined that the terminal is located in the service area, the SMF network element triggers establishment of the user-plane transmission channel, and performs step 1003 and steps following step 1003.

In a fourth possible implementation, if it is determined that the SSC mode of the PDU session is an SSC mode 1 or an SSC mode 3, and that the terminal is not located in the service area, the SMF network element triggers establishment of the user-plane transmission channel, and performs step 1003 and steps following step 1003.

Step 1003: The SMF network element sends a data notification acknowledgement message to the UPF network element.

Optionally, the data notification acknowledgement message includes packet discard indication information.

Step 1004: The SMF network element sends an N11 message to an AMF network element, where the N11 message is used to trigger establishment of the data transmission channel between the UPF and a RAN device of the PDU session of the received downlink data packet.

Step 1005: The AMF network element sends an N11 acknowledgement message to the SMF network element.

Figure 11:
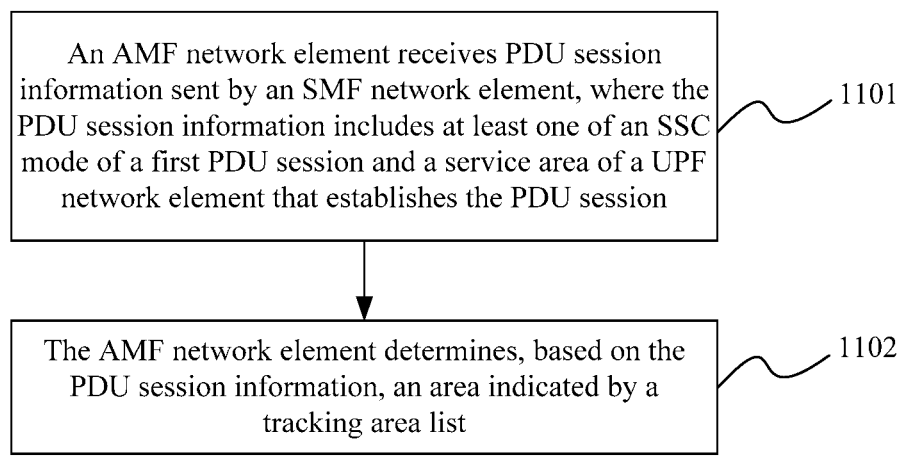
FIG. 11 is a schematic flowchart of a mobility management processing method according to an embodiment of this application.

An embodiment of this application further provides a method for generating a tracking area list. Specifically, FIG. 11 is a schematic flowchart of a mobility management processing method according to an embodiment of this application. The method includes the following steps:

Step 1101: An AMF network element receives PDU session information sent by an SMF network element, where the PDU session information includes at least one of an SSC mode of a first PDU session and a service area of a UPF network element that establishes the PDU session.

Step 1102: The AMF network element determines, based on the PDU session information, an area indicated by a tracking area list.

In step 1101, the AMF network element may receive, in a plurality of cases, the PDU session information sent by the SMF network element. For example, after a terminal initiates a registration process of establishing the first PDU session, the SMF determines the PDU session information based on the established first PDU session, and sends the PDU session information to the AMF network element.

In step 1102, if it is determined that the SSC mode of the first PDU session is an SSC mode 2, the AMF network element uses the service area as the area indicated by the tracking area list.

If the AMF network element determines that the SSC mode of the first PDU session is an SSC mode 2, the PDU session information includes an SSC mode of a second PDU session, and the SSC mode of the second PDU session is an SSC mode 1 or an SSC mode 3, the determined area indicated by the tracking area list includes a first-level area and a second-level area. The first-level area is an area indicated by a tracking area list exclusively used by the first PDU session, and the second-level area is an area indicated by a tracking area list shared by the first PDU session and the second PDU session. The first-level area may be the service area of the UPF corresponding to the first PDU session.

Optionally, the AMF network element may further send the tracking area list to the terminal. The terminal may subsequently determine, based on the PDU session information, to trigger a tracking area update procedure.

In this embodiment of this application, if the terminal has the first PDU session whose SSC mode is an SSC mode 2, the terminal triggers the tracking area update procedure when determining to leave the area indicated by the tracking area list exclusively used by the first PDU session. If the terminal has only the second PDU session whose SSC mode is an SSC mode 1 or an SSC mode 3, the terminal does not trigger the tracking area update procedure when determining to leave the area indicated by the tracking area list exclusively used by the first PDU session.

Optionally, the terminal does not initiate a location area update process when moving within an overlapping area of the first-level area and the second-level area.

The foregoing process is described below by using a specific embodiment.

Figure 12:
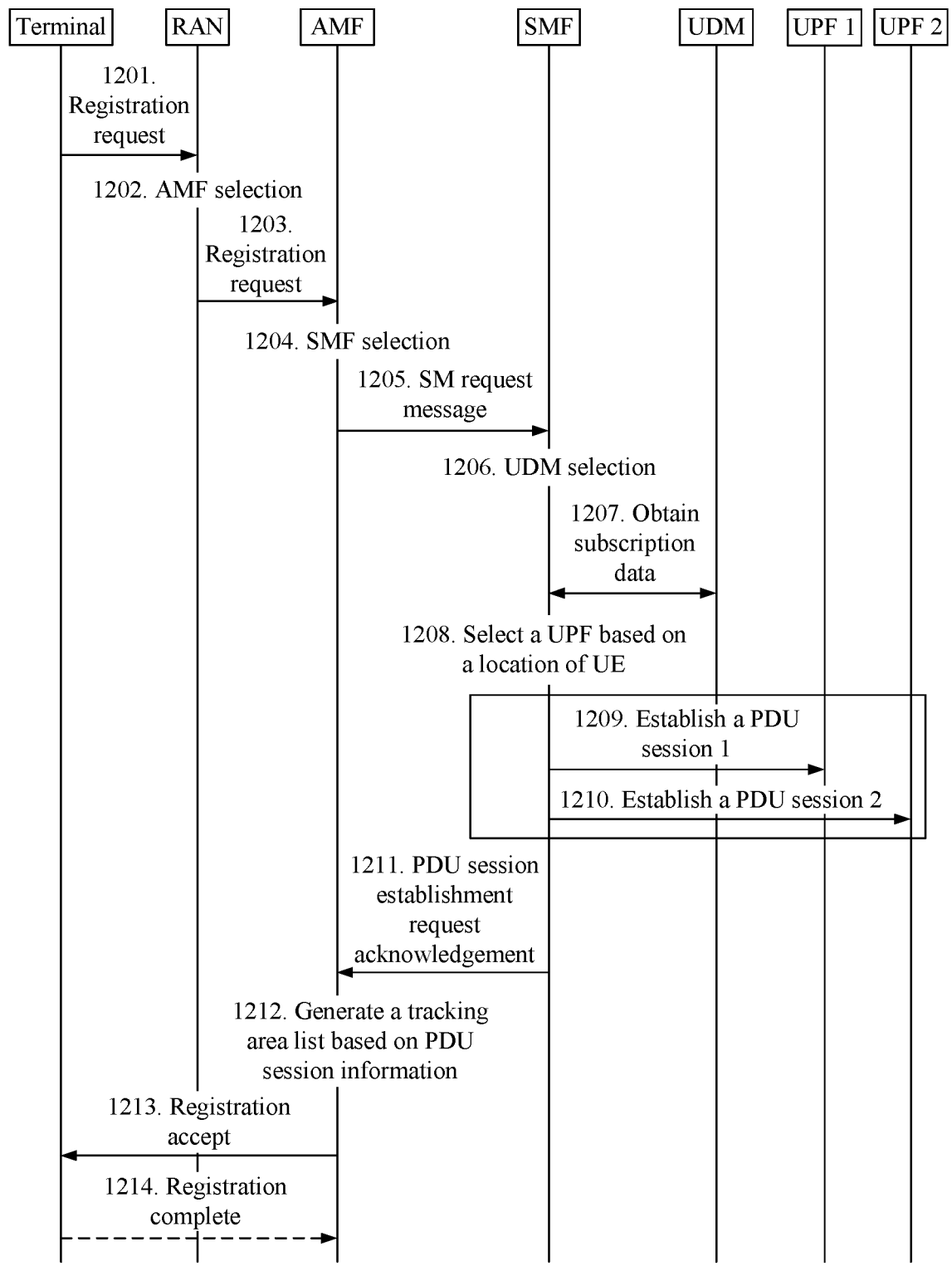
FIG. 12 is a schematic diagram of a mobility management processing method according to an embodiment of this application.

FIG. 12 is a schematic flowchart of a mobility management processing method according to an embodiment of this application. A procedure shown in FIG. 12 is described by using an example of a registration process of establishing a PDU session (for example, two PDU sessions are established in the registration process), but this embodiment of this application is not limited to the process.

Step 1 to step 4 are the same as steps in the prior art.

Step 1201: A terminal initiates a registration request message, to request to establish a PDU session.

Step 1202: A RAN network element selects an AMF network element for the terminal.

Step 1203: The RAN network element sends a registration request to the AMF network element.

Step 1204: The AMF network element selects an SMF network element for the terminal.

Step 1205: The AMF network element sends an SM request to the SMF network element, where the SM message includes location information of the terminal and service area restriction (Service Area Restriction/Mobility Restriction area).

The service area restriction is an area in which a communication service of a terminal is restricted. In this area, the terminal cannot establish any signaling/data connection to a mobile communications network, or respond to a service such as paging initiated by a network.

Step 1206: The SMF network element selects a UDM network element.

Step 1207: The SMF network element requests subscription data from the UDM network element, where the subscription data includes session-related subscription data.

Step 1208: The SMF network element selects a UPF network element based on a location of the terminal and further based on the service area restriction.

Step 1209 and step 1210: Establish a PDU session, where establishment of a PDU session 1 and a PDU session 2 is used as an example.

Step 1211: The SMF network element sends a PDU session establishment request acknowledgement message to the AMF network element, where the message includes PDU session information, and the PDU session information includes an SSC mode of the PDU session and/or a service area of the UPF.

Step 1212: The AMF network element generates a tracking area list based on the PDU session information, where a specific manner of generating the tracking area list may include, but is not limited to:

Manner a: If the PDU session is in an SSC mode 2, the service area of the UPF network element corresponding to the PDU session may be used as an area indicated by the tracking area list.

Manner b: If the PDU session is in an SSC mode 2 and an SSC mode 1 or an SSC mode 3, an area indicated by the generated tracking area list may include a first-level area and a second-level area, and when the tracking area list is generated, the service area of the UPF network element of the PDU session in the SSC mode 2 is independently used as the area indicated by the tracking area list of the PDU session.

Step 1213: The AMF network element sends a registration accept message to the terminal, where the message includes tracking area list information.

Step 1214: The terminal sends a registration complete message to the AMF network element.

If two levels of tracking area lists are generated in the manner b, if the two levels of tracking area lists have an overlapping area, the terminal does not initiate a location area update process when moving within the overlapping area; otherwise, the terminal initiates a location area update process.

With reference to the foregoing description, in this embodiment of this application, the SMF network element may receive service restriction area information sent by the AMF network element. Then the SMF network element may select, for the terminal based on the service restriction area information, the UPF network element that establishes the PDU session for the terminal.

Specifically, the SMF network element may determine at least one UPF network element based on location information of the terminal. Each of the at least one UPF network element may be a UPF network element whose service area covers a location indicated by the location information of the terminal. Certainly, the at least one UPF network element may be further determined in another manner. This is not limited herein.

The SMF network element may determine, as the UPF network element establishing the PDU session, a UPF network element that is in the at least one UPF network element and whose service area least overlaps an area indicated by the service restriction area information.

Figure 13:
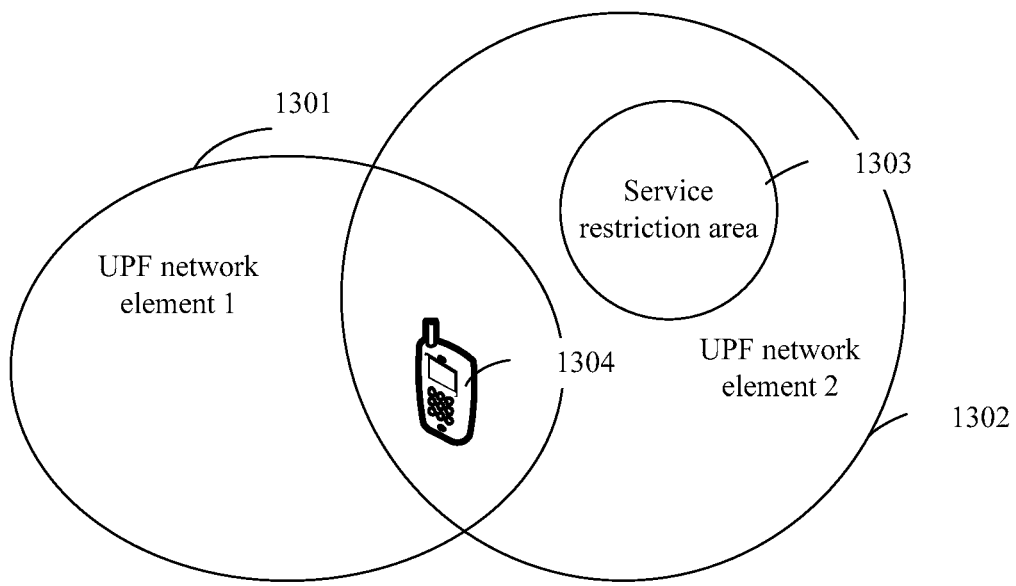
FIG. 13 is a schematic diagram of a service restriction area according to an embodiment of this application.

For example, FIG. 13 is a schematic diagram of a service restriction area according to an embodiment of this application. In FIG. 13, a terminal 1304 is located in both a coverage area of a service area 1301 of a UPF network element 1 and a coverage area of a service area 1302 of a UPF network element 2. Therefore, one of the UPF network element 1 and the UPF network element 2 may be used as a UPF network element used by the terminal 1304 to establish a PDU session. In addition, a service restriction area 1303 of the terminal 1304 is located in the coverage area of the service area 1302 of the UPF network element 2. Therefore, the UPF network element 1 may be determined as the UPF network element used by the terminal 1304 to establish the PDU session. The terminal 1304 may perceive a service restriction area, and a network side may implicitly perceive a motion track of the terminal 1304. For example, the terminal 1304 may not move to the area of the UPF network element 2 because the service restriction area is in the area, but there is a high possibility that the terminal 1304 moves to the area of the UPF network element 1. Therefore, it is better to select the UPF network element 1 rather than the UPF network element 2 for the terminal 1304.

Currently, after the terminal establishes a PDU session with a DN network element by using a first UPF network element, if the terminal moves out of a service area of the first UPF network element, if a network side pages the terminal in the area indicated by the tracking area list configured for the terminal, the terminal initiates a service request process based on the prior art after receiving a paging message. In the process, a data transmission channel of the terminal is restored, and a downlink data packet (including a cached data packet) received by the first UPF network element may be sent to the terminal by using the data transmission channel.

However, for some scenarios, the first UPF network element caches an application data packet, and an application on a DN network element side considers that a data packet is sent to the terminal by using the first UPF network element. However, when the terminal moves out of the service area of the first UPF network element, the network side may reselect, according to a reselection principle of the UPF network element, a UPF network element serving the terminal. Therefore, after the mobile network side reselects a second UPF network element for the terminal, if the application on the DN network element side cannot perform perception, the data packet is still sent to the first UPF network element. Therefore, the data packet cannot be sent to the terminal. Consequently, a service cannot be normally performed. In addition, even if the reselected UPF network element is still the first UPF network element, the first UPF network element may reallocate an IP address to the terminal. Therefore, the IP address of the terminal also changes. For the application, if a previous IP address of the terminal is still used as a target address of the data packet, the data packet cannot be normally sent to the terminal either.

In conclusion, even if the network side uses a paging process to enable the terminal to initiate the service request process, reselects a new UPF network element for the terminal, and establishes a new data packet transmission channel, the downlink data cannot be sent to the terminal, and the terminal cannot perceive the application that is of the downlink data packet and that triggers paging either. Therefore, the terminal cannot actively initiate a relationship with the application either, to implement data transmission.

Certainly, the terminal may initiate the service request process not only when the terminal is paged. If a terminal in an idle state actively initiates a service, the terminal also initiates the service request process. When the terminal initiates the service request process, a network-side device (the SMF/the AMF) may obtain location information of the terminal. Based on PDU session information of a current terminal, for example, if there is a PDU session in an SSC mode 2, and a location of the terminal is not within a service area of a UPF device of the session, the network side may reselect a UPF device for the PDU session, and the terminal is notified to initiate a PDU session establishment process.

Figure 14:
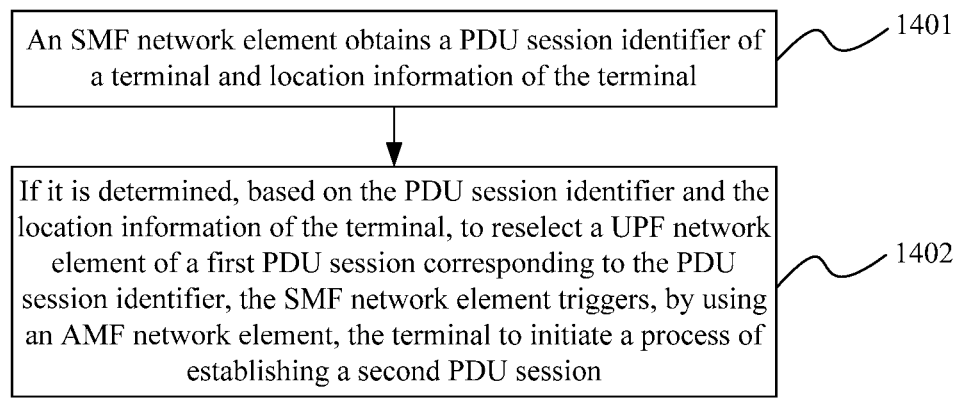
FIG. 14 is a schematic flowchart of a mobility management processing method according to an embodiment of this application.

Based on the foregoing description, FIG. 14 is a schematic diagram of a mobility management processing method according to an embodiment of this application.

Referring to FIG. 14, the method includes the following steps:

Step 1401: An SMF network element obtains a PDU session identifier of a terminal and location information of the terminal.

Step 1402: If it is determined, based on the PDU session identifier and the location information of the terminal, to reselect a UPF network element of a first PDU session corresponding to the PDU session identifier, the SMF network element triggers, by using an AMF network element, the terminal to initiate a process of establishing a second PDU session.

In step 1401, the SMF network element may receive the PDU session identifier of the terminal and the location information of the terminal that are sent by the AMF network element.

For example, after receiving a downlink data packet from the terminal, the UPF network element of the first PDU session sends a data notification message to the SMF network element, so that the SMF network element triggers the AMF network element to page the terminal. The data notification message may include the PDU session identifier of the first PDU session to which the downlink data packet belongs. After the AMF network element pages the terminal, the terminal may initiate a service request process by using the AMF network element, so as to obtain the location information of the terminal, and send the obtained PDU session identifier and the obtained location information to the SMF network element.

Optionally, the data notification message sent by the UPF network element of the first PDU session to the SMF network element may further include application information. Therefore, the SMF network element may receive the data notification message that includes the application information and that is sent by the UPF network element of the first PDU session. The application information may be application identifier information of the downlink data packet received by the UPF network element, or may be downlink data packets received by one or more UPF network elements. The data notification message is sent after the UPF network element of the first PDU session receives the downlink data packet from the terminal.

In this embodiment of this application, the SMF network element may further send the application information to the AMF network element, where the application information is used to notify the terminal of the application information used for triggering a paging process.

In step 1402, the SMF network element may trigger, in the following manner, the terminal to establish a second PDU session:

first determining, by the SMF network element, PDU session status information instructing the terminal to initiate the process of establishing the second PDU session, and sending the PDU session status information to the terminal by using the AMF network element, so as to trigger the terminal to initiate the process of establishing the second PDU session.

The PDU session status information may be determined by the SMF network element. For example, the SMF network element determines that the UPF network element of the PDU session needs to be reselected, so as to determine that a state of the PDU session is not available). The PDU session identifier and the PDU session status information are sent to the AMF network element, so that the AMF network element obtains status information of the PDU session, and notifies the terminal of the status information.

The SMF network element may determine the PDU session status information in another manner: When the SMF network element determines that the UPF network element of the PDU session needs to be reselected, the SMF network element initiates a process of releasing an original PDU session. The process of releasing the PDU session can be perceived by the AMF network element. For example, the SMF network element instructs the AMF network element to initiate the process of releasing the PDU session, to instruct a RAN network element to release a related data transmission channel. In the process, the AMF network element can perceive that the PDU session identified by the PDU session identifier is released. In other words, the PDU session status information of the session is not available. In this scenario, it may also be considered that the SMF network element determines the PDU session status information, and notifies the AMF network element of the PDU session status information.

After the terminal initiates the process of establishing the second PDU session, the network side may establish a new PDU session, namely, the second PDU session, for the terminal, so that the terminal can establish a connection to an application again, a service can be normally performed, system efficiency can be improved, and user experience can be improved.

It should be noted that the network side may establish the second PDU session for the terminal by using the UPF network element of the first PDU session, or may determine one UPF network element for the terminal again to establish the second PDU session. This is not limited in this embodiment of this application.

The foregoing process is specifically described below.

Figure 15:
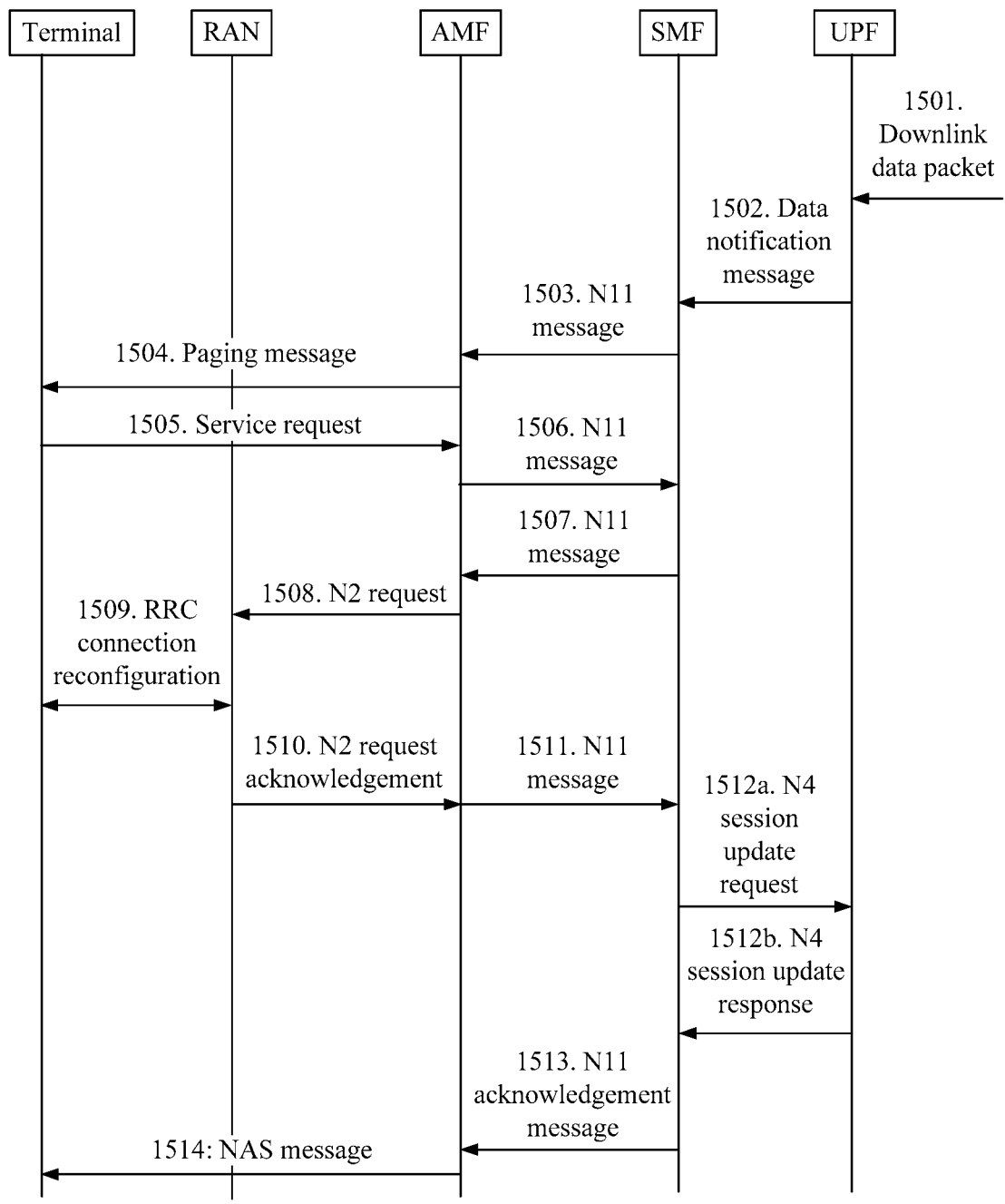
FIG. 15 is a schematic diagram of a PDU session establishment procedure according to an embodiment of this application.

FIG. 15 is a schematic diagram of a PDU session establishment procedure according to an embodiment of this application.

Step 1501: A UPF network element receives a downlink data packet.

Step 1502: The UPF network element sends a data notification message to an SMF network element, where the data notification message includes information such as a PDU session identifier. The PDU session identifier corresponds to a first PDU session.

Step 1503: The SMF network element sends an N11 message to an AMF network element, where the N11 message includes the PDU session identifier, SM information, and the like.

Step 1504: The AMF network element pages a terminal.

Step 1505: After the terminal to which the downlink data packet belongs receives a paging message, the terminal sends a service request message to the AMF network element, to initiate a service request process to establish a data transmission channel between the terminal and the UPF network element.

Step 1506: The AMF network element sends an N11 message to the SMF network element, where the N11 message includes information such as the PDU session identifier, and may also include location information of the terminal. The SMF network element may determine to reselect a UPF network element for the PDU session of the terminal, for example, based on the location information of the terminal. In this case, the SMF network element determines PDU session status information such as an indication that a current PDU session is not available. A specific form is not limited.

Step 1507: The SMF network element sends a message to the AMF network element, where the N11 message includes data transmission channel information on a core network side, so as to establish a data transmission channel to a RAN network element side.

Step 1508: The AMF network element sends an N2 request message to a RAN network element, where the N2 request message includes NAS service request accept information, the information may include the PDU session status information, PDU session information may indicate that the PDU session is not available and the like, and a specific form is not limited.

Optionally, in this step, if the AMF network element starts a timer, the N2 request message may also include timer information.

Step 1509: The RAN network element sends a radio resource control (RRC) connection reconfiguration process to the terminal, and in this process, the RAN network element side may notify the terminal of the PDU session status information and/or the timer information received in step 1508.

Step 1510: The RAN network element sends an N2 request acknowledgement message.

Step 1511: The AMF network element sends the N11 message.

Step 1512*a*: The SMF network element sends an N4 session update request to the UPF network element of the first PDU session.

Step 1512*b*: The UPF network element of the first PDU session sends an N4 session update response to the SMF network element.

Step 1510 to step 1512b are the same as steps in the prior art, and are performed to restore a data transmission channel between the terminal and the UPF network element of the first PDU session.

After the data transmission channel is established, the downlink data packet received by the UPF is sent to the terminal device, so that the terminal device can perceive information about an application sending downlink data, such as an application name or application server information.

Step 1513: The SMF network element sends an N11 message acknowledgement message to the AMF network element, where if no PDU session status information is included in step 1508, the PDU session information may be included in this step.

Step 1514: The AMF network element sends a NAS message to the terminal, where the NAS message includes the PDU session status information.

After the terminal receives the session status information, the terminal may initiate, based on an indication of the session status information, a new process of establishing the second PDU session. A specific form of the PDU session information is not limited, and may be that the first PDU session is not available, the PDU session is established again, or the like.

If the terminal further receives the timer information in step 1508, a timer may be started based on duration in the timer information, so as to complete step 1510 to step 1513 in the foregoing figure.

After the terminal initiates establishment of the second PDU session, the network side may select a corresponding UPF network element based on current location information of the terminal, to establish a data transmission channel between the terminal and a data network. The terminal determines, based on the received downlink data packet, the information about the application communicating with the terminal, so that the terminal may establish, by using the second PDU session, a communication relationship with the application corresponding to the application information.

Figure 16:
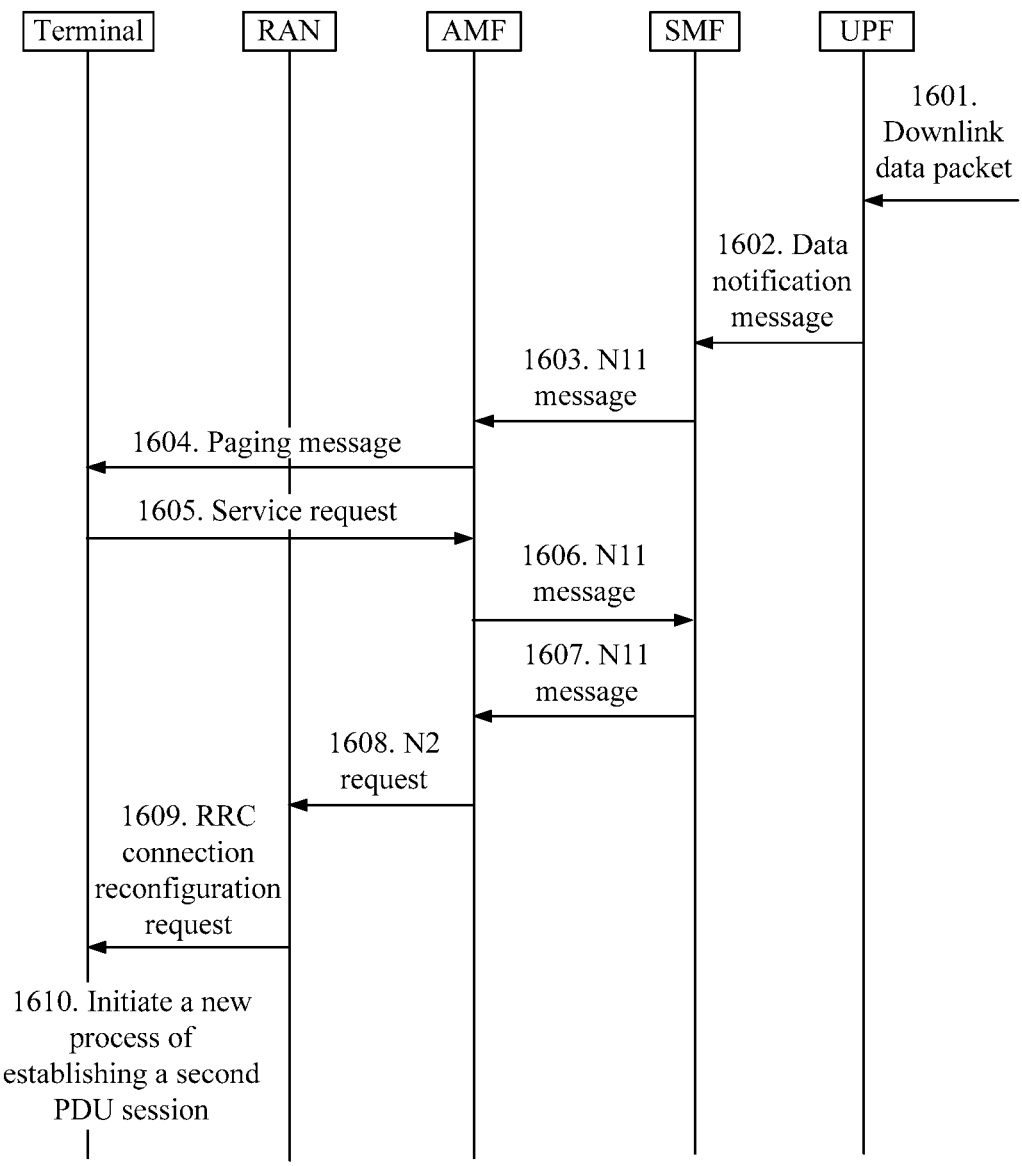
FIG. 16 is a schematic diagram of a PDU session establishment procedure according to an embodiment of this application.

FIG. 16 is a schematic diagram of a PDU session establishment procedure according to an embodiment of this application.

Step 1601: A UPF network element receives a downlink data packet.

Step 1602: The UPF network element sends a data notification message to an SMF network element, where the data notification message includes information such as a PDU session identifier. The PDU session identifier corresponds to a first PDU session.

The data notification message may further include application information. A specific form of the application information is not limited, and may be information such as some or all cached data packets or an application identifier.

Step 1603: The SMF network element sends an N11 message to an AMF network element, where the N11 message includes the PDU session identifier, SM information, and the like.

Step 1604: The AMF network element pages a terminal.

Step 1605: After the terminal to which the downlink data packet belongs receives a paging message, the terminal sends a service request message to the AMF network element, to initiate a service request process to establish a data transmission channel between the terminal and the UPF network element.

Step 1606: The AMF network element sends an N11 message to the SMF network element, where the N11 message includes the PDU session identifier, and may also include location information of the terminal. The SMF network element may determine to reselect a UPF for the first PDU session, for example, based on the location information of the terminal. In this case, the SMF network element determines PDU session status information such as an indication that a current PDU session is not available. A specific form is not limited.

Step 1607: The SMF network element sends an N11 message to the AMF network element, where the N11 message includes data transmission channel information on a core network side, so as to establish a data transmission channel to a RAN side.

Step 1608: The AMF network element sends an N2 request message to a RAN network element, where the message includes NAS service request accept information, and the information may include the PDU session status information, or may optionally include information such as an application identifier.

Step 1609: The RAN network element sends an RRC connection reconfiguration process to the terminal, and in this process, a RAN network element side may notify the terminal of the PDU session status information. Optionally, the RAN network element may further notify the terminal of the application identifier information.

Step 1610: After the terminal receives the session status information, the terminal may initiate, based on an indication of the session status information, a new process of establishing a second PDU session. A specific form of the PDU session status information is not limited, and may be that the PDU session is not available, the PDU session is established again, or the like.

In the process of establishing the second PDU session, a network side may reselect a UPF network element different from the UPF network element of the first PDU session for the terminal, to establish the second PDU session. In this case, after establishment of the second PDU session is completed, the terminal establishes, based on the received application information, a connection to an application indicated by the application information, so that a service can be normally performed, and user experience can be improved.

An embodiment of this application further provides a mobility management processing apparatus.

Figure 17:
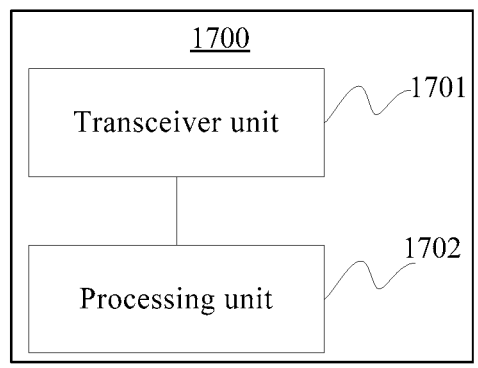
FIG. 17 is a schematic structural diagram of a mobility management processing apparatus according to an embodiment of this application.

FIG. 17 is a schematic structural diagram of a mobility management processing apparatus according to an embodiment of this application. The apparatus may perform step 401 to step 403 in the procedure shown in FIG. 4, and content related to step 401 to step 403.

Referring to FIG. 17, the apparatus 1700 includes:

a transceiver unit 1701, configured to: receive a data notification message that includes a protocol data unit (PDU) session identifier and that is sent by a user plane function (UPF) network element, and determine, based on the PDU session identifier, a session and service continuity (SSC) mode corresponding to the PDU session identifier and/or a service area of the user plane function (UPF) network element, where the UPF network element is a network element that establishes a PDU session corresponding to the PDU session identifier; and a processing unit 1702, configured to determine a paging area based on the SSC mode and/or the service area of the UPF network element, where the transceiver unit is configured to send a first message including the paging area to an access and mobility management function AMF network element, where the first message is used to trigger the AMF network element to page, in the paging area, a terminal that establishes the PDU session by using the UPF network element.

Optionally, the processing unit 1702 is further configured to:

if it is determined that the SSC mode is an SSC mode 2, use the service area as the paging area; or if it is determined that the SSC mode is an SSC mode 1 or an SSC mode 3, use, as the paging area, an area indicated by a tracking area list; or determine the paging area based on the tracking area list and the service area of the UPF network element.

Optionally, the processing unit 1702 is further configured to:

determine, as the paging area, an overlapping area of the service area and the area indicated by the tracking area list.

Optionally, the first message further includes a paging policy; and the paging policy includes one or more of the following:

a quantity of paging times, where the quantity of paging times indicates a quantity of times for which the AMF network element pages the terminal;

a paging cycle, where the paging cycle indicates a cycle in which the AMF network element pages the terminal; and paging indication information, where the paging indication information indicates a manner in which the AMF network element pages the terminal.

Optionally, the processing unit 1702 is further configured to:

start a first timer; and if it is determined after the first timer times out that the AMF network element receives no paging response, send packet discard indication information to the UPF network element by using the processing unit, where the packet discard indication information is used to instruct the UPF network element to discard downlink data received from the terminal.

Figure 18:
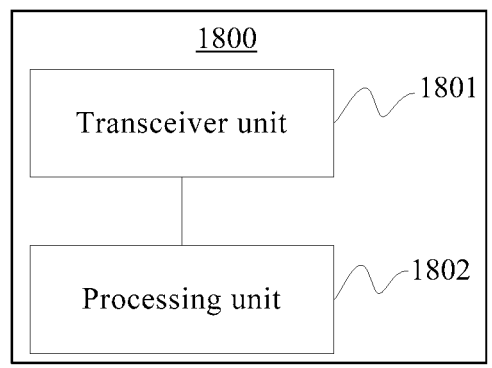
FIG. 18 is a schematic structural diagram of a mobility management processing apparatus according to an embodiment of this application.

FIG. 18 is a schematic structural diagram of a mobility management processing apparatus according to an embodiment of this application. The apparatus may perform step 404 and step 405 in the procedure shown in FIG. 4, and content related to step 404 and step 405.

Referring to FIG. 18, the apparatus 1800 includes:

a transceiver unit 1801, configured to receive a first message that includes a paging area and that is sent by a session management function (SMF) network element, where the paging area is determined by the SMF network element based on a session and service continuity (SSC) mode and/or a service area of a user plane function (UPF) network element, the SSC mode and/or the service area of the UPF network element are/is determined by the SMF network element based on an obtained protocol data unit (PDU) session identifier, and the UPF network element is a network element that establishes a PDU session corresponding to the PDU session identifier; and a processing unit 1802, configured to page, in the paging area by using the transceiver unit, a terminal that establishes, by using the UPF network element, the PDU session corresponding to the PDU session identifier.

Optionally, the transceiver unit 1801 is further configured to:

send a second message to a radio access network network element, where the second message includes a paging area, and the second message is used to trigger the radio access network network element to page the terminal based on the paging area.

Optionally, the paging area in the second message is used by the radio access network network element to determine the paging area in which the radio access network network element pages the terminal.

Optionally, the first message further includes a paging policy; and the paging policy includes one or more of the following:

a quantity of paging times, where the quantity of paging times is used to indicate a quantity of times of paging the terminal;

a paging cycle, where the paging cycle is used to indicate a cycle of paging the terminal; and paging indication information, where the paging indication information is used to indicate a manner of paging the terminal.

Figure 19:
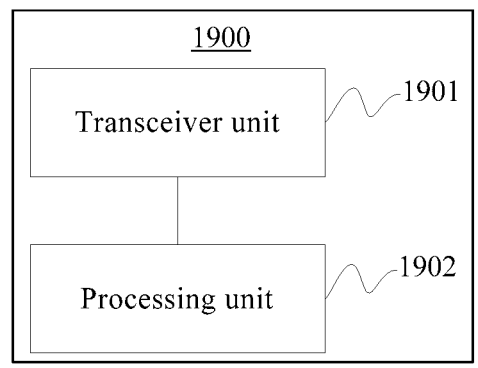
FIG. 19 is a schematic structural diagram of a mobility management processing apparatus according to an embodiment of this application.

FIG. 19 is a schematic structural diagram of a mobility management processing apparatus according to an embodiment of this application. The apparatus may perform step 701 and step 702 in the procedure shown in FIG. 7, and content related to step 701 and step 702.

Referring to FIG. 19, the apparatus 1900 includes:

a transceiver unit 1901, configured to receive a data notification message that includes a protocol data unit (PDU) session identifier and that is sent by a user plane function (UPF) network element; and a processing unit 1902, configured to determine, based on the PDU session identifier, at least one of a session and service continuity (SSC) mode corresponding to the PDU session identifier and a service area of the UPF network element, where the UPF network element is a network element that establishes a PDU session corresponding to the PDU session identifier, where the transceiver unit 1901 is configured to send a first message to an access and mobility management function (AMF) network element, where the first message includes at least one of the SSC mode and the service area, and the first message is used to trigger the AMF network element to page a terminal that establishes the PDU session by using the UPF network element.

Optionally, the processing unit 1902 is further configured to:

start a first timer; and if it is determined after the first timer times out that no paging response is received, discard a downlink data packet received from the terminal.

Figure 20:
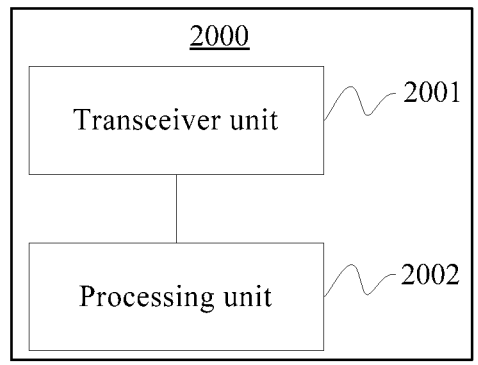
FIG. 20 is a schematic structural diagram of a mobility management processing apparatus according to an embodiment of this application.

FIG. 20 is a schematic structural diagram of a mobility management processing apparatus according to an embodiment of this application. The apparatus may perform step 703 and step 704 in the procedure shown in FIG. 7, and content related to step 703 and step 704.

Referring to FIG. 20, the apparatus 2000 includes:

a transceiver unit 2001, configured to receive a first message sent by a session management function (SMF) network element, where the first message includes at least one of a session and service continuity (SSC) mode and a service area of a user plane function (UPF) network element, the SSC mode and the service area are determined by the SMF network element based on an obtained protocol data unit (PDU) session identifier, and the service area is a service area of the user plane function (UPF) network element that establishes a PDU session corresponding to the PDU session identifier; and a processing unit 2002, configured to: determine a paging area based on at least one of the SSC mode and the service area, and page, in the paging area, a terminal that establishes the PDU session by using the UPF network element.

Optionally, the processing unit 2002 is further configured to:

if it is determined that the SSC mode is an SSC mode 1, determine, as the paging area, an area indicated by a tracking area list; or if it is determined that the SSC mode is an SSC mode 2 or an SSC mode 3, determine the service area as the paging area, or determine an overlapping area of the service area and a tracking area list as the paging area.

Optionally, the transceiver unit 2001 is further configured to:

send a second message to a radio access network network element, where the second message includes a paging area, and the second message is used to trigger the radio access network network element to page the terminal based on the paging area.

Optionally, the second message further includes a paging policy; and the paging policy includes one or more of the following:

a quantity of paging times, where the quantity of paging times is used to indicate a quantity of times for which the radio access network network element pages the terminal;

a paging cycle, where the paging cycle is used to indicate a cycle in which the radio access network network element pages the terminal; and paging indication information, where the paging indication information is used to indicate a manner in which the radio access network network element pages the terminal.

Figure 21:
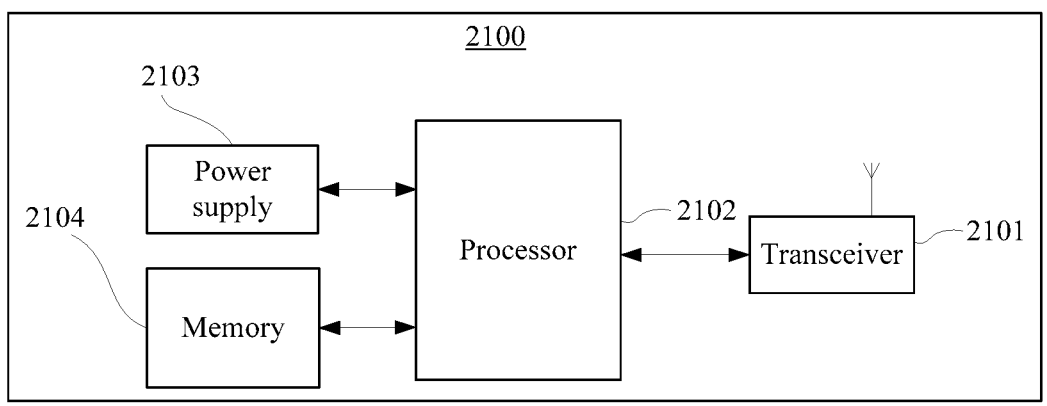
FIG. 21 is a schematic structural diagram of a mobility management processing apparatus according to an embodiment of this application.

FIG. 21 is a schematic structural diagram of a mobility management processing apparatus according to an embodiment of this application. The apparatus may perform step 401 to step 403 in the procedure shown in FIG. 4, and content related to step 401 to step 403.

Referring to FIG. 21, the apparatus 2100 includes:

a transceiver 2101, configured to: receive a data notification message that includes a protocol data unit (PDU) session identifier and that is sent by a user plane function (UPF) network element, and determine, based on the PDU session identifier, a session and service continuity (SSC) mode corresponding to the PDU session identifier and/or a service area of the user plane function (UPF) network element, where the UPF network element is a network element that establishes a PDU session corresponding to the PDU session identifier; and a processor 2102, configured to determine a paging area based on the SSC mode and/or the service area of the UPF network element, where the transceiver is configured to send a first message including the paging area to an access and mobility management function (AMF) network element, where the first message is used to trigger the AMF network element to page, in the paging area, a terminal that establishes the PDU session by using the UPF network element.

The apparatus may further include a power supply 2103 (for example, a battery) that supplies power to components. Optionally, the power supply 2103 may be logically connected to the processor 2102 by using a power management system, so as to implement functions such as charging, discharging, and power consumption management by using the power management system.

The apparatus may further include a memory 2104, the memory 2104 may be configured to store a software program and a module, and the processor 2102 runs the software program and the module that are stored in the memory 2104, to perform function applications and data processing of the apparatus.

Optionally, the processor 2102 is further configured to:

if it is determined that the SSC mode is an SSC mode 2, use the service area as the paging area; or if it is determined that the SSC mode is an SSC mode 1 or an SSC mode 3, use, as the paging area, an area indicated by a tracking area list; or determine the paging area based on the tracking area list and the service area of the UPF network element.

Optionally, the processor 2102 is further configured to:

determine, as the paging area, an overlapping area of the service area and the area indicated by the tracking area list.

Optionally, the first message further includes a paging policy; and the paging policy includes one or more of the following:

a quantity of paging times, where the quantity of paging times indicates a quantity of times for which the AMF network element pages the terminal;

a paging cycle, where the paging cycle indicates a cycle in which the AMF network element pages the terminal; and paging indication information, where the paging indication information indicates a manner in which the AMF network element pages the terminal.

Optionally, the processor 2102 is further configured to:

start a first timer; and if it is determined after the first timer times out that the AMF network element receives no paging response, send packet discard indication information to the UPF network element by using the processor, where the packet discard indication information is used to instruct the UPF network element to discard downlink data received from the terminal.

Figure 22:
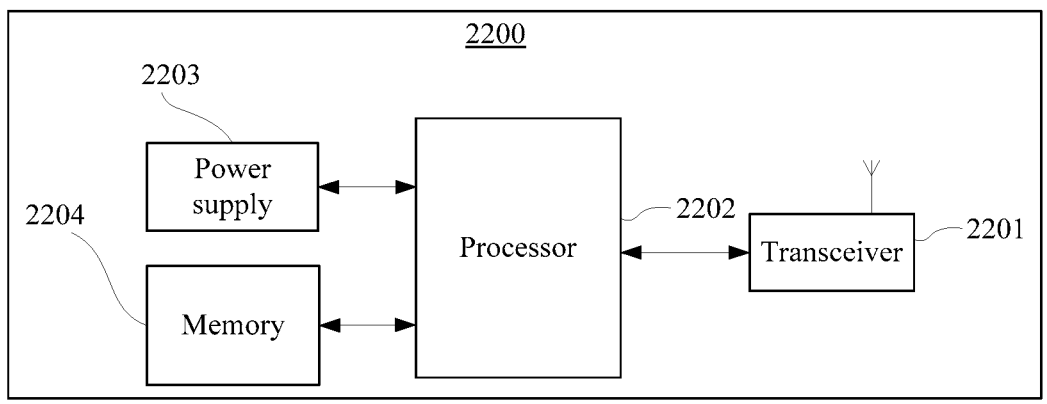
FIG. 22 is a schematic structural diagram of a mobility management processing apparatus according to an embodiment of this application.

FIG. 22 is a schematic structural diagram of a mobility management processing apparatus according to an embodiment of this application. The apparatus may perform step 404 and step 405 in the procedure shown in FIG. 4, and content related to step 404 and step 405.

Referring to FIG. 22, the apparatus 2200 includes:

a transceiver 2201, configured to receive a first message that includes a paging area and that is sent by a session management function (SMF) network element, where the paging area is determined by the SMF network element based on a session and service continuity (SSC) mode and/or a service area of a user plane function (UPF) network element, the SSC mode and/or the service area of the UPF network element are/is determined by the SMF network element based on an obtained protocol data unit (PDU) session identifier, and the UPF network element is a network element that establishes a PDU session corresponding to the PDU session identifier; and a processor 2202, configured to page, in the paging area by using the transceiver, a terminal that establishes, by using the UPF network element, the PDU session corresponding to the PDU session identifier.

The apparatus may further include a power supply 2203 (for example, a battery) that supplies power to components. Optionally, the power supply 2203 may be logically connected to the processor 2202 by using a power management system, so as to implement functions such as charging, discharging, and power consumption management by using the power management system.

The apparatus may further include a memory 2204, the memory 2204 may be configured to store a software program and a module, and the processor 2202 runs the software program and the module that are stored in the memory 2204, to perform function applications and data processing of the apparatus.

Optionally, the transceiver 2201 is further configured to:
send a second message to a radio access network network element, where the second message includes a paging area, and the second message is used to trigger the radio access network network element to page the terminal based on the paging area.

Optionally, the paging area in the second message is used by the radio access network network element to determine the paging area in which the radio access network network element pages the terminal.

Optionally, the first message further includes a paging policy; and
the paging policy includes one or more of the following:
a quantity of paging times, where the quantity of paging times is used to indicate a quantity of times of paging the terminal;
a paging cycle, where the paging cycle is used to indicate a cycle of paging the terminal; and
paging indication information, where the paging indication information is used to indicate a manner of paging the terminal.

Figure 23:
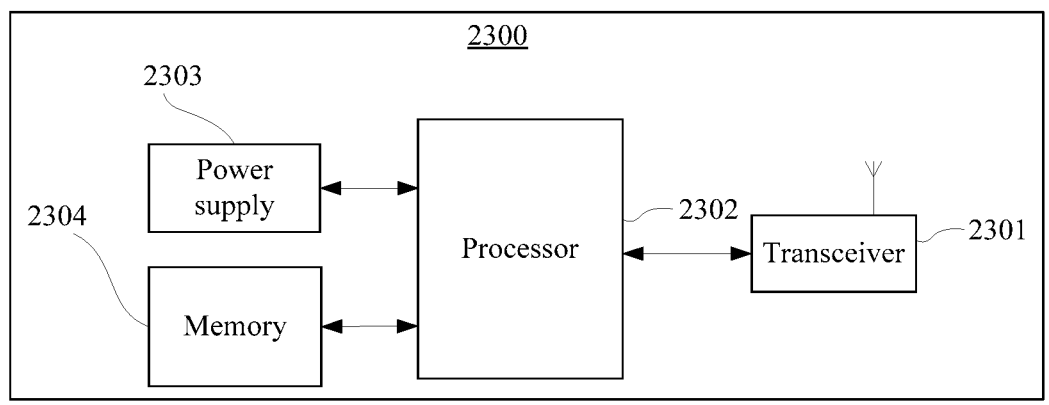
FIG. 23 is a schematic structural diagram of a mobility management processing apparatus according to an embodiment of this application.

FIG. 23 is a schematic structural diagram of a mobility management processing apparatus according to an embodiment of this application. The apparatus may perform step 701 and step 702 in the procedure shown in FIG. 7, and content related to step 701 and step 702.

Referring to FIG. 23, the apparatus 2300 includes:
a transceiver 2301, configured to receive a data notification message that includes a protocol data unit (PDU) session identifier and that is sent by a user plane function (UPF) network element; and
a processor 2302, configured to determine, based on the PDU session identifier, at least one of a session and service continuity (SSC) mode corresponding to the PDU session identifier and a service area of the UPF network element, where the UPF network element is a network element that establishes a PDU session corresponding to the PDU session identifier, where
the transceiver 2301 is configured to send a first message to an access and mobility management function (AMF) network element, where the first message includes at least one of the SSC mode and the service area, and the first message is used to trigger the AMF network element to page a terminal that establishes the PDU session by using the UPF network element.

The apparatus may further include a power supply 2303 (for example, a battery) that supplies power to components. Optionally, the power supply 2303 may be logically connected to the processor 2302 by using a power management system, so as to implement functions such as charging, discharging, and power consumption management by using the power management system.

The apparatus may further include a memory 2304, the memory 2304 may be configured to store a software program and a module, and the processor 2302 runs the software program and the module that are stored in the memory 2304, to perform function applications and data processing of the apparatus.

Optionally, the processor 2302 is further configured to:
start a first timer; and
if it is determined after the first timer times out that no paging response is received, discard a downlink data packet received from the terminal.

Figure 24:
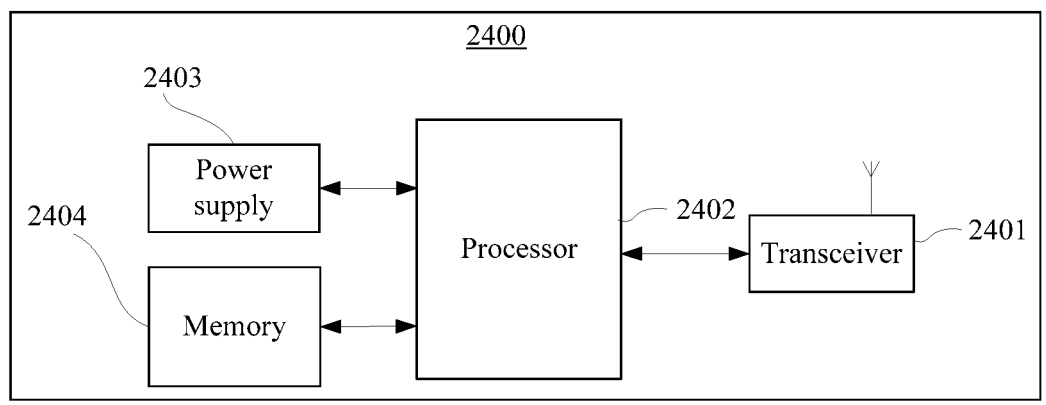
FIG. 24 is a schematic structural diagram of a mobility management processing apparatus according to an embodiment of this application.

FIG. 24 is a schematic structural diagram of a mobility management processing apparatus according to an embodiment of this application. The apparatus may perform step 703 and step 704 in the procedure shown in FIG. 7, and content related to step 703 and step 704.

Referring to FIG. 24, the apparatus 2400 includes:
a transceiver 2401, configured to receive a first message sent by a session management function (SMF) network element, where the first message includes at least one of a session and service continuity (SSC) mode and a service area of a user plane function (UPF) network element, the SSC mode and the service area are determined by the SMF network element based on an obtained protocol data unit (PDU) session identifier, and the service area is a service area of the user plane function (UPF) network element that establishes a PDU session corresponding to the PDU session identifier; and
a processor 2402, configured to: determine a paging area based on at least one of the SSC mode and the service area, and page, in the paging area, a terminal that establishes the PDU session by using the UPF network element.

The apparatus may further include a power supply 2403 (for example, a battery) that supplies power to components. Optionally, the power supply 2403 may be logically connected to the processor 2402 by using a power management system, so as to implement functions such as charging, discharging, and power consumption management by using the power management system.

The apparatus may further include a memory 2404, the memory 2404 may be configured to store a software program and a module, and the processor 2402 runs the software program and the module that are stored in the memory 2404, to perform function applications and data processing of the apparatus.

Optionally, the processor 2402 is further configured to:
if it is determined that the SSC mode is an SSC mode 1, determine, as the paging area, an area indicated by a tracking area list; or
if it is determined that the SSC mode is an SSC mode 2 or an SSC mode 3, determine the service area as the paging area, or determine an overlapping area of the service area and a tracking area list as the paging area.

Optionally, the transceiver 2401 is further configured to:
send a second message to a radio access network network element, where the second message includes a paging area, and the second message is used to trigger the radio access network network element to page the terminal based on the paging area.

Optionally, the second message further includes a paging policy; and
the paging policy includes one or more of the following:
a quantity of paging times, where the quantity of paging times is used to indicate a quantity of times for which the radio access network network element pages the terminal;
a paging cycle, where the paging cycle is used to indicate a cycle in which the radio access network network element pages the terminal; and
paging indication information, where the paging indication information is used to indicate a manner in which the radio access network network element pages the terminal.

An embodiment of this application further provides a computer readable storage medium, configured to store a computer software instruction used for performing an operation to be performed by the foregoing processor, and the computer software instruction includes a program used for performing an operation to be performed by the foregoing processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A session management method, the method comprising:
   when a terminal device initiates a service request process,
      receiving, by a session management network element, location information of the terminal device and a session identifier of a first session of the terminal device from a mobility management network element;
   determining, by the session management network element based on the location information of the terminal device and the session identifier of the first session, to re-select a user plane network element of the first session; and
   sending, by the session management network element, first information to the mobility management network element, wherein the first information is used to trigger the terminal device to establish a second session.

2. The method according to claim 1, further comprising:
   instructing, by the session management network element, the mobility management network element to initiate a process of releasing the first session.

3. The method according to claim 1, wherein a session and service continuity (SSC) mode of the first session is mode 2.

4. The method according to claim 1, wherein a location of the terminal device is not in a service area of the user plane network element of the first session.

5. The method according to claim 1, further comprising:
   sending, by the session management network element, second information to the mobility management network element, wherein the second information is used to instruct the mobility management network element to initiate a process of releasing the first session.

6. A session management network element, comprising:
   a non-transitory memory; and
   at least one processor coupled to the non-transitory memory, wherein the at least one processor is configured to execute instructions stored in the non-transitory memory to cause the session management network element to:
      when a terminal device initiates a service request process, receive location information of the terminal device and a session identifier of a first session of the terminal device from a mobility management network element;
      determine, based on the location information of the terminal device and the session identifier of the first session, to re-select a user plane network element of the first session; and
      send first information to the mobility management network element, wherein the first information is used to trigger the terminal device to establish a second session.

7. The session management network element according to claim 6, wherein the at least one processor is configured to execute the instructions stored in the non-transitory memory to further cause the session management network element to:
   instruct the mobility management network element to initiate a process of releasing the first session.

8. The session management network element according to claim 6, wherein a session and service continuity (SSC) mode of the first session is mode 2.

9. The session management network element according to claim 6, wherein a location of the terminal device is not in a service area of the user plane network element of the first session.

10. The session management network element according to claim 6, wherein the at least one processor is configured to execute the instructions stored in the non-transitory memory to further cause the session management network element to:
   send second information to the mobility management network element, wherein the second information is used to instruct the mobility management network element to initiate a process of releasing the first session.

11. A system comprising:
    a mobility management network element; and
    a session management network element, wherein the session management network element is configured to:
       when a terminal device initiating a service request process, receive location information of the terminal device and a session identifier of a first session of the terminal device from the mobility management network element;

determine, based on the location information of the terminal device and the session identifier of the first session, to re-select a user plane network element of the first session; and send first information to the mobility management network element, wherein the first information is used to trigger the terminal device to establish a second session.

12. The system according to claim 11, wherein the session management network element is further configured to:
instruct the mobility management network element to initiate a process of releasing the first session.

13. The system according to claim 11, wherein a session and service continuity (SSC) mode of the first session is mode 2.

14. The system according to claim 11, wherein a location of the terminal device is not in a service area of the user plane network element of the first session.

15. The system according to claim 11, wherein the mobility management network element is configured to:
receive second information from the session management network element, wherein the second information is used to instruct the mobility management network element to initiate a process of releasing the first session.

\* \* \* \* \*